United States Patent [19]
Burke, Jr. et al.

[11] 3,948,960
[45] Apr. 6, 1976

[54] PROCESSES FOR PREPARING POLYMERS

[76] Inventors: Oliver W. Burke, Jr., 1510 SW. 13th Court, Pompano Beach, Fla. 33061; Joseph Austin A. Kizer, 211 SE. 6th Court, Pompano Beach, Fla. 33061; Pauls Davis, 30027 White St., Gibralter, Mich. 48173

[22] Filed: Jan. 25, 1974

[21] Appl. No.: 436,745

Related U.S. Application Data

[63] Continuation-in-part of Ser. No. 356,722, May 3, 1973, Pat. No. 3,873,584.

[52] U.S. Cl.......... 260/407; 260/635 H; 260/94.2 R; 260/32.8 R; 260/33.4 R; 260/33.2 R
[51] Int. Cl.².......................................... C08H 3/00
[58] Field of Search............ 260/407, 23 ST, 23 CP, 260/635 H, 94.2 R, 32.8 R, 33.4 R, 33.2 R

[56] References Cited
UNITED STATES PATENTS

| | | | |
|---|---|---|---|
| 1,891,203 | 12/1932 | Ambror | 260/23 ST |
| 2,335,454 | 11/1943 | Schurtz | 260/23 ST |
| 2,429,582 | 10/1947 | Morris | 260/23 CP |
| 3,475,338 | 10/1969 | Carlor | 260/23 CP |
| 3,540,906 | 11/1970 | Fauber | 260/23 ST |
| 3,650,791 | 3/1972 | Fauber | 260/23 ST |
| 3,673,168 | 6/1972 | Burke et al | 260/23 ST |

FOREIGN PATENTS OR APPLICATIONS

| | | | |
|---|---|---|---|
| 957,788 | 12/1959 | United Kingdom | 260/23 ST |
| 621,467 | 11/1943 | United Kingdom | 260/23 ST |
| 2,215,748 | 4/1971 | Germany | 260/23 ST |

*Primary Examiner*—Winston A. Douglas
*Assistant Examiner*—John F. Niebling
*Attorney, Agent, or Firm*—Hall & Houghton

[57] ABSTRACT

A new process is provided for forming polymer material having a number average molecular weight in the range of 500 to 10,000, and which contains hydroxyl groups, by forming a combination of two intraphase polymerization systems by combining suitable proportions of selected monomer material with from 0–95 parts by weight of selected drying oil substance, aqueous hydrogen peroxide, and selected liquid organic mutual solvent-diluent therefor, and heating the combination at sufficient temperatures between 100°C. and 200°C. for sufficient time to form polymer material having said number average molecular weight and containing groups derived from the solution of the hydrogen peroxide in said liquid organic mutual solvent-diluent.

15 Claims, 10 Drawing Figures

Phase Boundary Lines
Area left of lines - two phases
Area right of lines - single phase Data Line A
(Parts by Weight)

| Isopropanol | 11 | 13 | 15 | 20 |
|---|---|---|---|---|
| 50% Aq. $H_2O_2$ | 3 | 3 | 3 | 3 |
| Butadiene | 29 | 40.5 | 56.5 | 103 |

Data Line B
(Parts by Weight)

| Isopropanol | 10 | 15 | 20 | 25 |
|---|---|---|---|---|
| 35% Aq. $H_2O_2$ | 3 | 3 | 3 | 3 |
| Butadiene | 14 | 32.5 | 60.5 | 95 |

Data Line C
(Parts by Weight)

| Isopropanol-water Azeotrope | 15 | 20 | 25 | 30 |
|---|---|---|---|---|
| 50% Aq. $H_2O_2$ | 3 | 3 | 3 | 3 |
| Butadiene | 11.8 | 17.1 | 22.7 | 28.4 |

Data Line D
(Parts by Weight)

| Isopropanol-water Azeotrope | 15 | 20 | 25 | 30 |
|---|---|---|---|---|
| 35% Aq. $H_2O_2$ | 3 | 3 | 3 | 3 |
| Butadiene | 9.1 | 13.7 | 17.8 | 24.0 |

PROCESSES FOR PREPARING POLYMERS

CROSS REFERENCE TO RELATED APPLICATIONS

This application is a continuation-in-part of application Ser. No. 356,722, filed May 3, 1973 now U.S. Pat. No. 3,873,584. The disclosure of said application is incorporated herein by reference as are the disclosures of the applications antecedent thereto and incorporated by reference therein, namely: application Ser. No. 318,910 filed Dec. 27, 1972 now abandond; application Ser. No. 860,163 filed Sept. 9, 1969 now U.S. Pat. No. 3,522,340; application Ser. No. 594,947 (now abandoned), which was filed Nov. 16, 1966; application Ser. No. 447,530 (now abandoned), which was filed Apr. 12, 1965; and application Ser. No. 863,218 filed Dec. 31, 1959 (now abandoned).

INTRODUCTION AND GENERAL OBJECTS

The invention herein disclosed relates to the production of polymers; especially low molecular weight polymers, having hydroxyl groups including those solid at ambient temperatures, and which comprise essentially polymerized ethylenically unsaturated monomer material together with from 0 to 95 percent drying oil substance; and it aims generally to provide improved processes for the production of such polymers.

The invention provides polymers of this class which have number average molecular weights in the range of from 500 to 10,000; which are essentially free of obnoxious odors, and which contain controlled oxygen content and hydroxyl functionality, by effecting polymerization of monomer material with 0–95% drying oil substance to form improved polymers having the above enumerated characteristics, by a process employing a combination of two intraphase polymerization systems employing a unique catalyst and solvent combination, which contributes to the attaining of the foregoing objects.

Other and further objects and advantages of the invention will become apparent from the following description and examples of preferred embodiments thereof.

The invention resides in the novel features of the processes herein disclosed and is more particularly defined in the appended claims.

For ease of reference the present description is indexed by sub-heads and catchlines which, however, are not to be regarded as limiting the invention in any way.

SPECIAL AIMS AND UTILITIES

The present invention in one aspect achieves various of the foregoing objects by initiating intraphase polymerizations at temperatures above 100°C., preferably above 110°C., of monomer material, and drying oil substances if desired, employing a combination of aqueous hydrogen peroxide as catalyst, in a mutual solvent-diluent to establish a combination of two single intraphase polymerization systems, the mutual solvent-diluent comprising at least one compound which contains at least one group selected from the class consisting of hydroxyl, keto and ether groups and combinations thereof, the proportions of the ingredients being such that a combination of two phases is formed each being an intraphase polymerization system, i.e. each comprising polymerizable unsaturated material, aqueous hydrogen peroxide, and mutual solvent-diluent.

By this process the invention achieves polymerizaton to produce the desired polymers at adequate and controllable rates of polymerization with economy of mutual solvent-diluent, said polymers being characterized by the fact that their groups, except for the great bulk of polymer from unsaturated material therein, are essentially derived from the solution of hydrogen peroxide in the mutual solvent-diluent. It also provides other new and useful improvements which will be apparent from the following general and detailed descriptions of illustrative embodiments of the invention.

The polymers produced by the invention are useful as resin and/or binder components, in protective and decorative coatings and for other purposes for which low molecular weight polymers of the class described are desired.

The present invention, in more detail, achieves various of the foregoing objects in that it forms polymer material having a number average molecular weight in the range of 500 to 10,000, by (a) forming a combination of two intraphase polymerization systems by combining the following ingredients: (1) from 0–95 parts by weight of drying oil substance selected from the class consisting of the drying oils, the air-blown or bodied drying oils, and the fatty acids derived from the foregoing, and dimers, trimers, and tetramers thereof, (2) from 5–100 parts by weight of polymerizable monomer material selected to consist essentially of from 2 to 100 percent by weight of material having a water solubility at 20°C. of no more than 3.5 weight percent and from 0 to 98 percent by weight of material having a water solubility at 20°C. greater than 3.5 weight percent, and selected from the ethylenically unsaturated monomers that have and are polymerizable with the aid of hydrogen peroxide through at least one $>C=C<$ group and contain not more than 14 carbon atoms; (3) an amount in the range of from 0.5 to 10 parts by weight of hydrogen peroxide (100% basis) per 100 parts by weight of said ingredients (1) and (2); (4) an amount in the range of 0.4 to 50 parts by weight of water per 100 parts by weight of ingredients (1), (2) and (5); and (5) an amount in the range of from 5 to 100 parts by weight, per 100 parts by weight of ingredients (1) and (2), of liquid organic mutual solvent-diluent for said hydrogen peroxide, monomer material, water and any drying oil substance present therewith, which amount of mutual solvent lies at a point in said range sufficiently high to enable step (b) to produce polymer in said average molecular weight range but not so high as to completely convert the two phases into a single phase, and is at least half as great by weight as the weight solvent-diluent ingredient (4), and which liquid organic mutual solventdiluent comprises at least one compound which contains at least one group selected from the class consisting of hydroxyl, keto and ether groups and combinations thereof; and (b) heating said combination at sufficient temperature in the range of above 100°C. to about 200°C. for sufficient time to form polymer material having a number average molecular weight in the range of 500 to 10,000 and containing groups derived from the solution of the hydrogen peroxide in said liquid organic mutual solvent-diluent.

GENERAL DESCRIPTION

The crux of the present invention resides in the polymerization of (A) selected monomer material having at least one >C = C< bond including vinylidene and/or diene monomers, together with selected drying oil substance or without the same, by the formation of two individually homogeneous intraphase polymerization systems by combining (B) aqueous hydrogen peroxide and (C) mutual solvent-diluent for the hydrogen peroxide, the material of (A), and any other water present, which thus renders the combination of (B) and (C) soluble in the materials (A) in the intrapolymerization phases in proportions appropriate to promote adequately rapid but controllable polymerization of the selected material (A), at elevated temperatures above 100°C. to about 200°C., to form polymer product having a number average molecular weight which lies in the range of from about 500 to about 10,000 and having groups which, except for the polymerized monomer material and any drying oil substance therein, are hydroxyl groups essentially derived from the solution of hydrogen peroxide in the mutual solvent-diluent.

The most suitable mutual solvent-diluents are those selected from the alcohols, alcohol-ketones, alcohol-ethers, and alcohol-esters which contained not more than six carbon atoms.

Also employed as mutual solvent-diluents, in addition to those which are miscible in water in all proportions, are (1) those materials of the class described which are miscible with water only in limited proportions, but sufficiently so to produce the combination of two intraphase polymerization systems of the ingredients; (2) those materials of the class described which are miscible with water in at least such limited proportions in combination with essentially non-water miscible diluent in such proportions as to render the combination a mutual solvent-diluent; and (3) azeotropic mixtures of the foregoing which are advantageous for recovery purposes.

At elevated temperatures, i.e., above 100°C. and especially above 110°C. with aqueous hydrogen peroxide per se, certain of the mutual solvent-diluents are apt to be oxidized.

Unpredictably, it has been found according to this invention that in the presence of the polymerizable monomer material hereof, such oxidative processes assume a minor role and polymerization of the monomer material proceeds to satisfactory degrees of conversion in reasonable periods of time which may be considerably in excess of the time ordinarily required for such oxidation reactions at similarly elevated temperatures.

In one aspect of the invention, polymers, especially in the above indicated molecular weight range, are produced from drying oil substances and monomer material, e.g., butadiene, in which aqueous hydrogen peroxide is virtually insoluble. If the monomer material is merely mixed with aqueous hydrogen peroxide then two phases result but these are not a combination of two single intraphase polymerization systems, but rather a two phase interfacial polymerization system which produces at the interface by interphase polymerization a small amount of a different, high molecular weight product not within the required number average molecular weight range of this invention, or a larger amount of such different polymer if the interfacial area is increased by use of an emulsifier. However, when, in accordance with the present invention, there is combined, with an appropriate amount of hydrogen peroxide, an appropriate proportion of mutual solvent-diluent of the class described, then this combination when added to the monomer and the drying oil substance forms two clear homogenous solutions therewith, and at elevated temperatures, e.g. above 100°C., intraphase polymerization is initiated which can be controlled to maintain the polymerization at sufficient temperatures to obtain in say 3 to 4 hours a conversion of from about 40% to about 100% of the monomer to polymer. The product, e.g. from styrene when having the desired average molecular weight is generally a solid at ambient temperatures and when from butadiene and drying oil, when freed of unreacted and residual materials, is a viscous liquid polymer-drying oil composition within the specified molecular weight range, and comprises hydroxyl groups, which groups are derived from the solution of the hydrogen peroxide in the mutual solvent-diluent. Following the same practice with other vinylidene and/or conjugated diene monomers individually or in various combinations, produces similarly useful polymers.

In a particular aspect of the invention there is employed as mutual solvent-diluent, an aqueous azeotropic mixture of the mutual solvent-diluent, with or without additional solvent for either the monomer material and/or the drying oil. The use of aqueous azeotrope facilitates separation and recovery for reuse of the mutual solvent-diluent from the water and polymer.

Also we have discovered that the amount of mutual solvent-diluent required for obtaining products in the designated number average molecular weight range for given amounts of the aqueous hydrogen peroxide and other ingredients may be reduced, as compared to the amount thereof required to dissolve all the materials present in one single phase, by providing a combination of two intraphase polymerization systems, by the use of at least 5 parts by weight of mutual solvent-diluent and frequently somewhat more, per 100 parts by weight of monomer material and any drying oil substance present, in order to insure that polymerization essentially will take place within the phases rather than at the interface between them.

BRIEF DESCRIPTION OF THE DRAWINGS

In the accompanying drawings illustrative of aspects of the invention.

Figure 1:
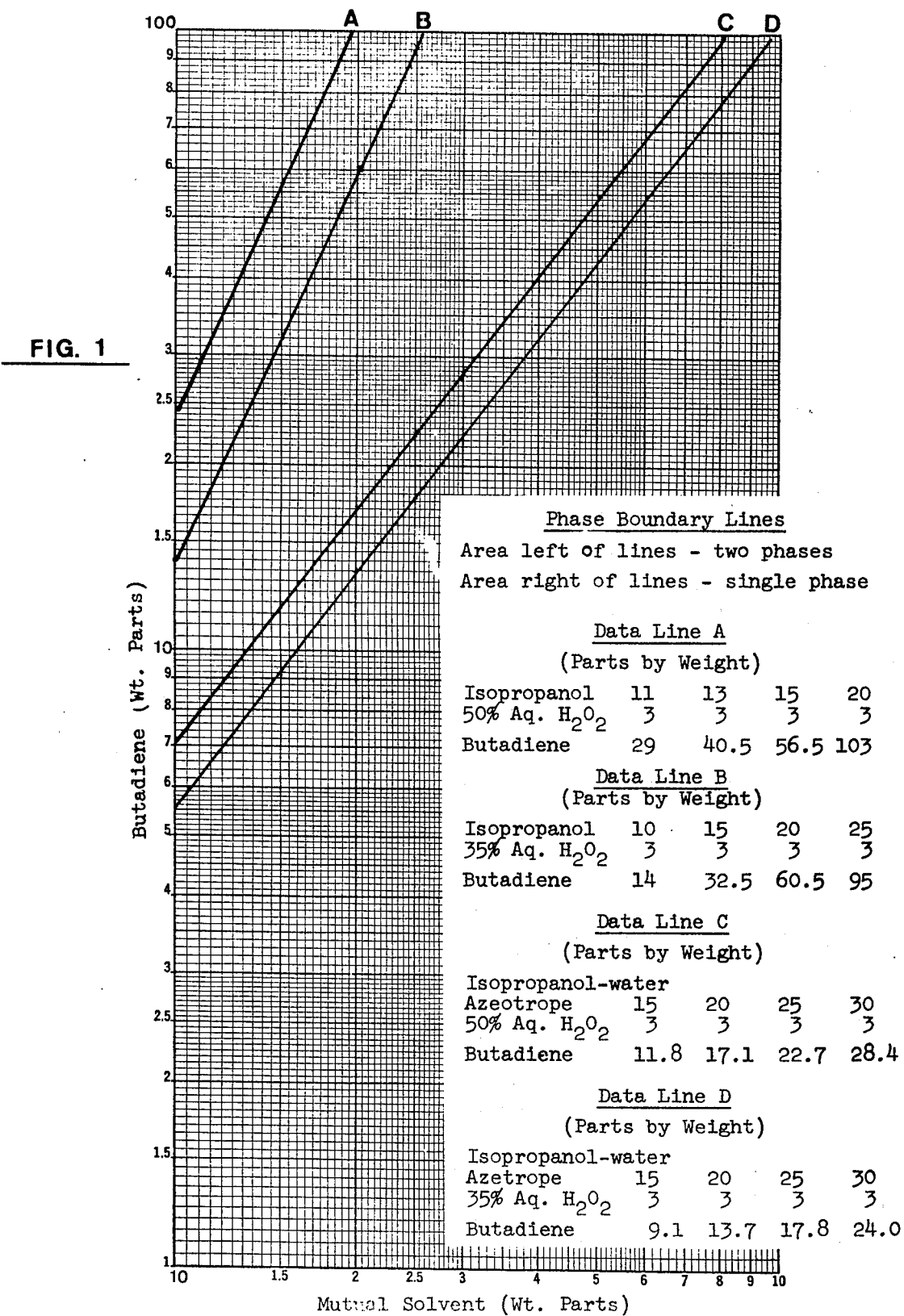
FIG. 1 is a set of plots in logarithmic scale, wherein lines A and B are plots of the weight of a mutual solvent-diluent, isopropanol, required to just dissolve in one single phase at ambient temperature (approximately 75°F.) various weights of butadiene with 3 parts by weight of 50% aqueous hydrogen peroxide, and 3 parts by weight of 35% aqueous hydrogen peroxide, respectively; and lines C and D are similar plots in which the isopropanol is replaced by isopropanol-water azeotrope (which contains 87.8% isopropanol and 12.2% water)

By extrapolation from lines B, C, or D of FIG. 1, similar coordinate diagrams can be prepared for those lines; and by preparing plots similar to FIG. 1, for other mutual solvents and/or other monomers and/or combinations thereof with or without drying oil substances, lines may be obtained for extrapolation to form the applicable triangular coordinate phase diagrams for such other combinations of ingredients.

Figure 2:
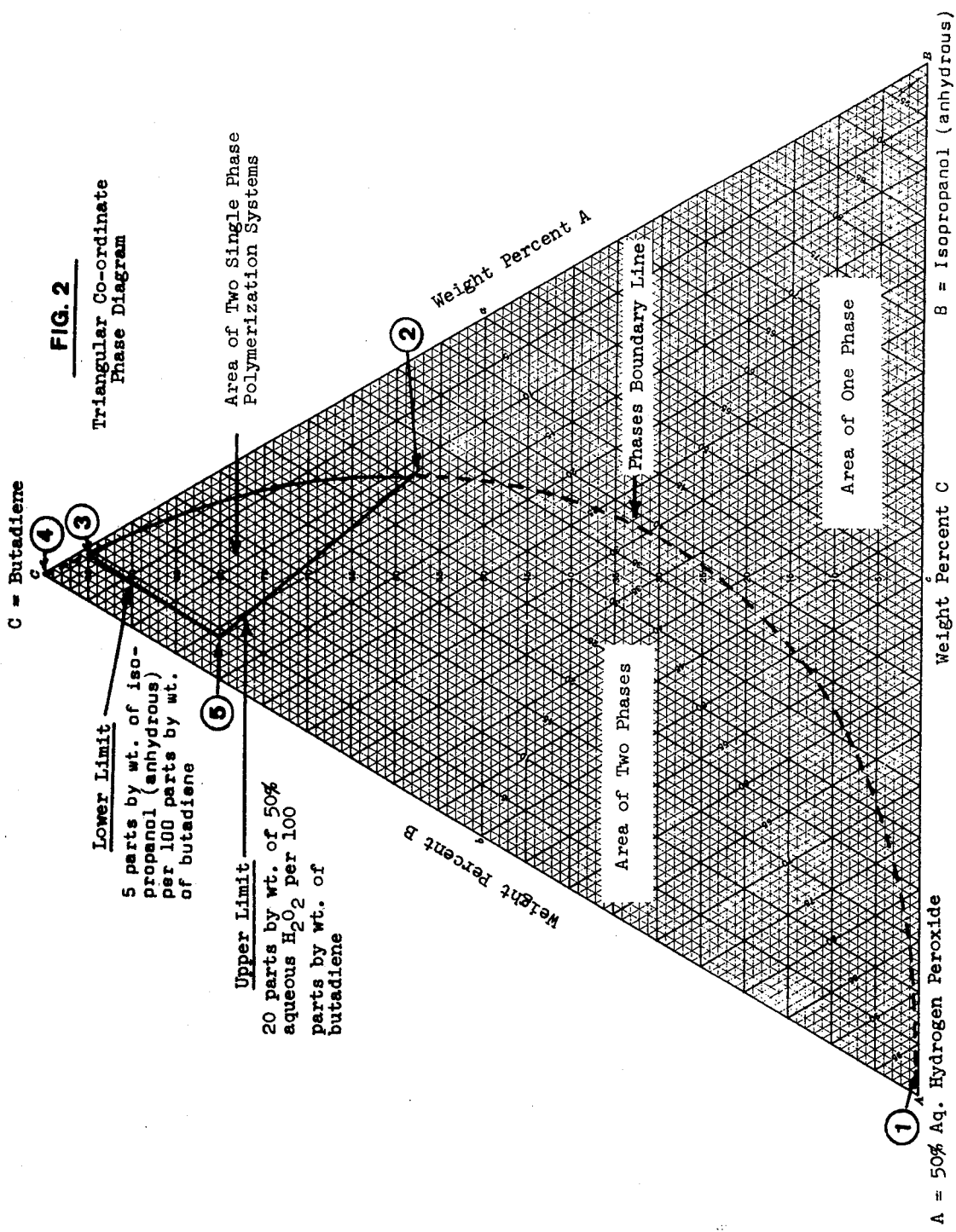
FIG. 2 is a triangular coordinate phase diagram (extrapolated from line A of FIG. 1) for solutions of butadiene, 50% aqueous hydrogen peroxide, and isopropanol as mutual solvent-diluent, showing the ternary proportions thereof for producing at ambient temperature (75°F.) one single phase solution system (to the right of the phase boundary line 1, 2, 3, 4), and the range of ternary proportions thereof for forming two single phase systems (to the left of the boundary line 1, 2, 3, 4); the restricted region 2, 5, 3, 2 embracing the compositions which provide two intraphase polymerization systems selectable in accordance with the present invention for polymerization at sufficient temperatures and times to produce polymer having a number average molecular weight in the range of 500 to 10,000 and containing groups derived from the solutions of the hydrogen peroxide in the liquid organic mutual solvent-diluent.
Figure 3:
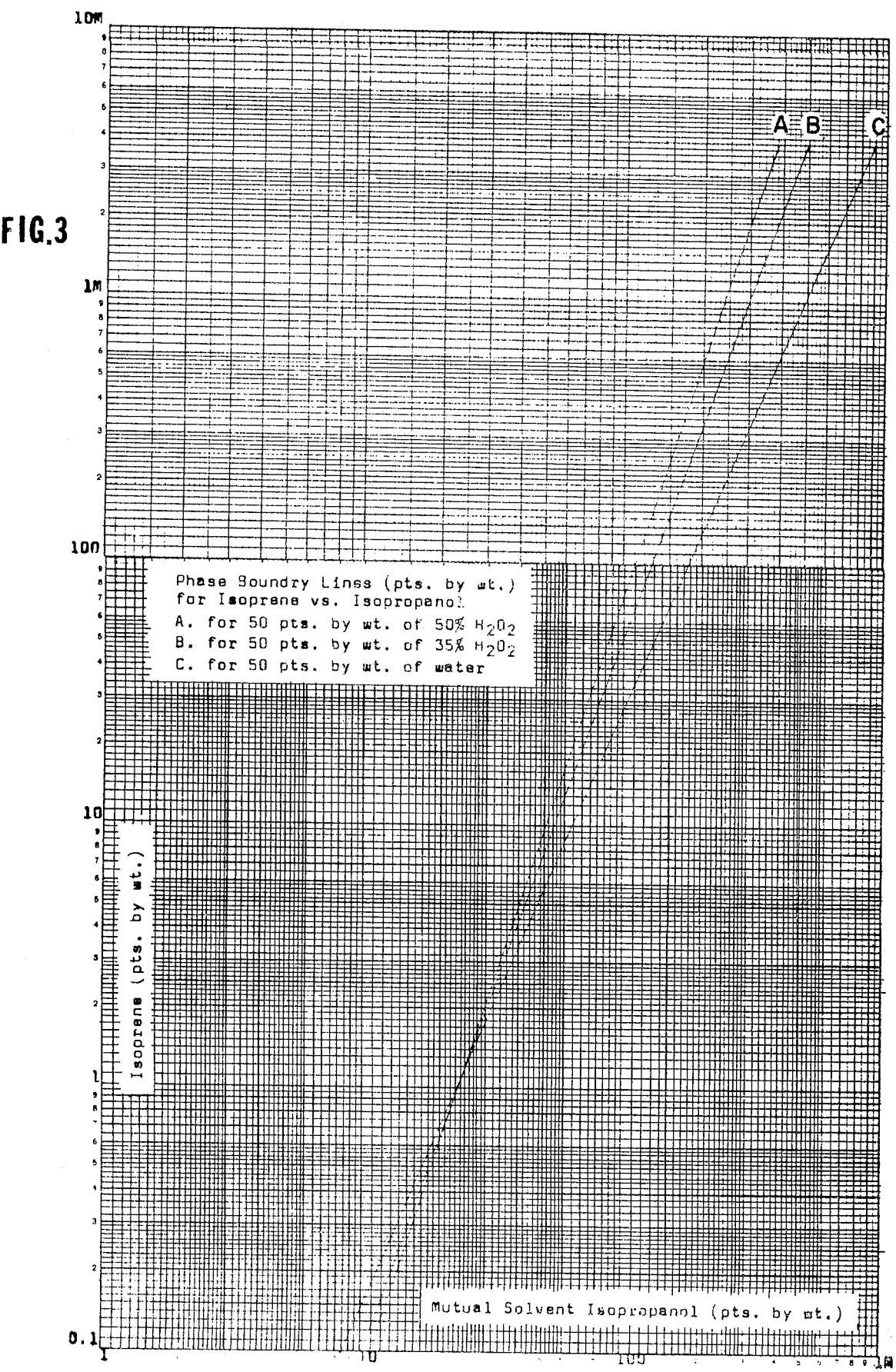
Figure 4:
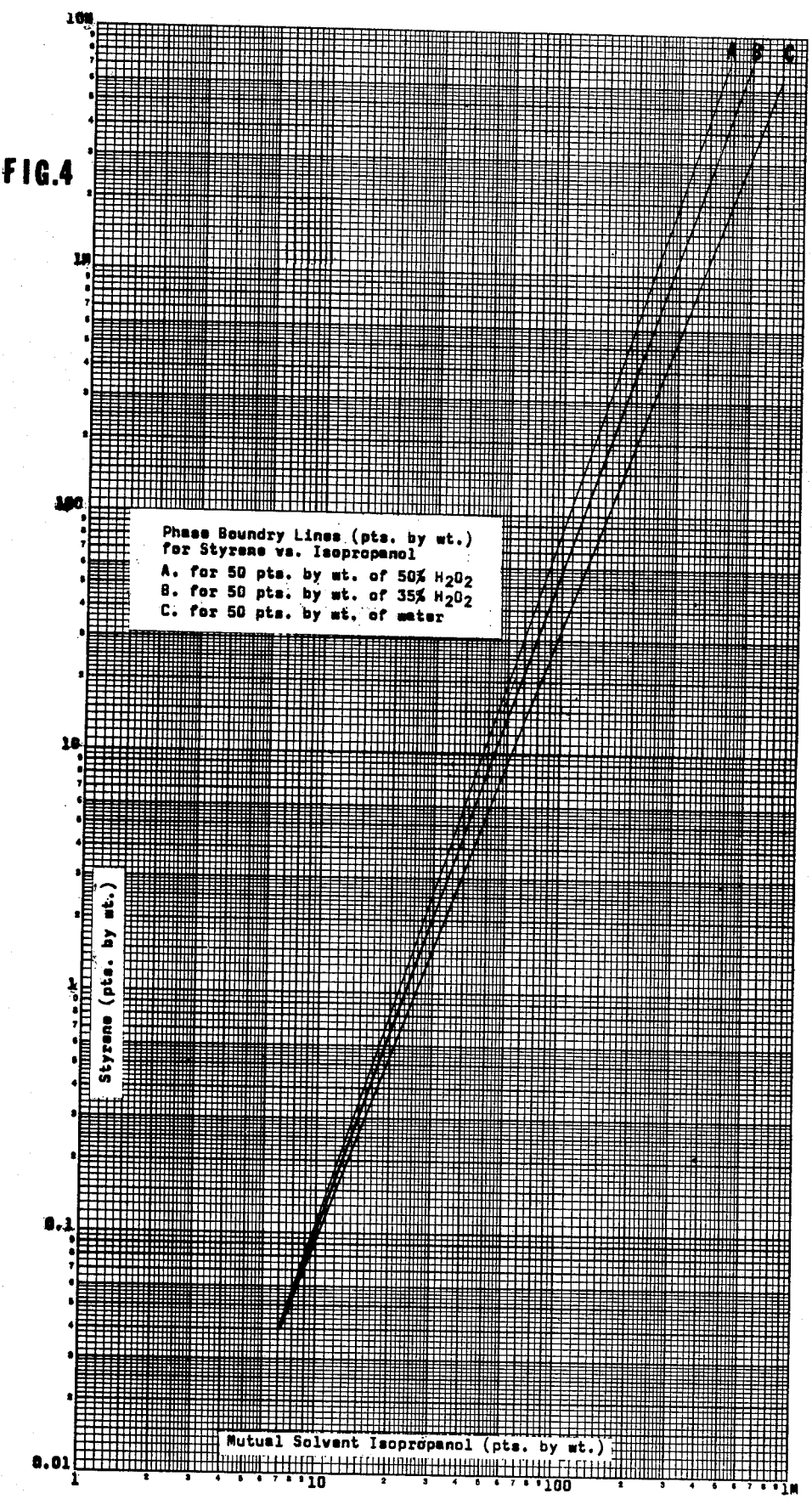
Figure 5:
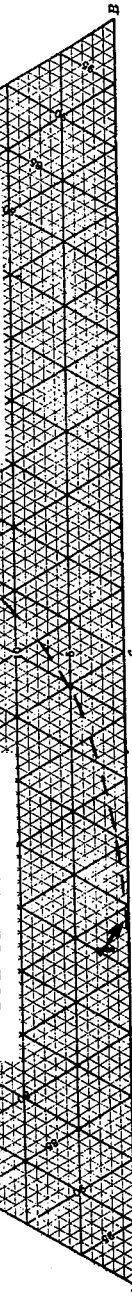
Figure 6:
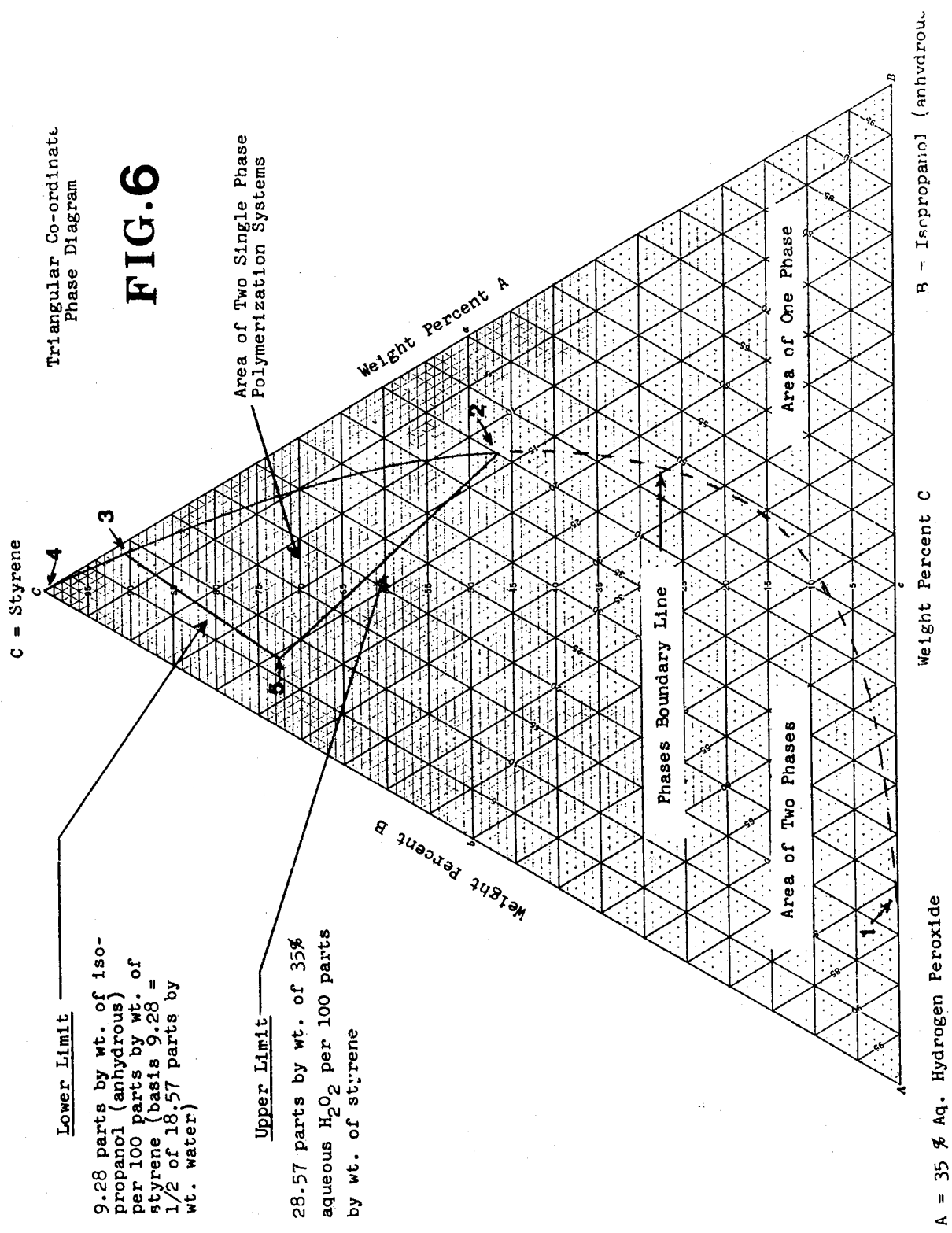

Thus, FIG. 2 is typical of the triangular coordinate diagrams constructable as aforesaid for delineating the boundaries 2, 5, 3, 2 of the areas of two intraphase polymerization systems contemplated by the present invention;

FIG. 3 like FIG. 1 is a set of plots in logarithmic scale, where lines A, B and C are plots of the weight of the mutual solvent-diluent isopropanol required to just dissolve in a single phase at ambient temperature (approximately 75°F.) various weights of isoprene with the following: for plot A 50 parts by weight of 50% aqueous hydrogen peroxide, for plot B 50 parts by weight 35% aqueous hydrogen peroxide and for comparative purposes plot C with 50 parts by weight of water;

FIG. 4 like FIG. 1 and FIG. 3 is a set of plots in logarithmic scale, where lines A, B and C are plots of the weight of the mutual solent-diluent isopropanol required to just dissolve in a single phase at ambient temperature (approximately 75°F.) various weights of styrene with the following: for plot A 50 parts by weight of 50% aqueous hydrogen peroxide, for plot B 50 parts by weight 35% aqueous hydrogen peroxide and for definition purposes plot C with 50 parts by weight of water;

FIG. 5 like FIG. 2 is a triangular coordinate phase diagram (plotted in percent from line B of FIG. 3) for solutions of isoprene, 35% aqueous hydrogen peroxide, and isopropanol as mutual solvent-diluent, showing the ternary proportions thereof for producing at ambient temperature (75°F.) one single phase solution system (to the right of the phase boundary line 1, 2, 3, 4), and the range of ternary proportions thereof for forming two single phase systems (to the left of the boundary line 1, 2, 3, 4); the restricted region 2, 5, 3, 2 embracing the compositions which provide two intraphase polymerization systems selectable in accordance with the present invention for polymerization at sufficient temperatures and times to produce polymer having a number average molecular weight in the range of 500 to 10,000 and containing groups derived from the solutions of the hydrogen peroxide in the liquid organic mutual solvent-diluent;

FIG. 6 like FIGS. 2 and 5 is a triangular coordinate phase diagram (plotted in percent from line B of FIG. 4) for solutions of styrene, 35% aqueous hydrogen peroxide, and isopropanol as mutual solvent-diluent, showing the ternary proportions thereof for producing at ambient temperature (75°F.) one single phase solution system (to the right of the phase boundary line 1, 2, 3, 4), and the range of ternary proportions thereof for forming two phases (to the left of the boundary line 1,2,3,4); the restricted region 2, 5, 3, 2 embracing the compositions which provide two intraphase polymerization systems selectable for polymerization at sufficient temperatures and times to produce polymer having a number average molecular weight in the range of 500 to 10,000 and containing groups derived from the solutions of the hydrogen peroxide in the liquid organic mutual solvent-diluent.

Tables 1 and 2 are prepared from FIG. 3 lines B and C respectively. In Table 1 are given the values of the solubility of isoprene in 35% aqueous hydrogen peroxide and isopropanol and such values are expressed as weight parts, weight per cent, and then as parts by volume and finally as density. Table 2 is similar to Table 1 with water being substituted for the aqueous 35% hydrogen peroxide.

Tables 3 and 4 are similar to Tables 1 and 2 except that the values taken from FIG. 4 plots B and C are given for the solubility of styrene in 35% aqueous hydrogen peroxide and isopropanol for Table 3 and for the solubility of styrene in water and isopropanol for Table 4. Again in both these tables the values are expressed as weight parts, weight per cent, parts by volume and then as density.

TABLE 1

Solubility of Isoprene in 35% Aqueous Hydrogen Peroxide and Isopropanol

| A | B | C | D* | E | F | G | H | J | K | L | M | N |
|---|---|---|---|---|---|---|---|---|---|---|---|---|
| 35% H$_2$O$_2$ Wt. | Isopropanol Wt. | Isoprene Wt. | Total Wt. | 35% H$_2$O$_2$ % | Isopropanol % | Isoprene % | Total % | 35% H$_2$O$_2$ Vol. | Isopropanol Vol. | Isoprene Vol. | Total Vol. | Density Wt./Vol. |
| 50 | 13 | 0.20 | 63.2 | 79.11 | 20.57 | 0.32 | 100 | 70.12 | 26.07 | 0.46 | 96.65 | 1.0347 |
| 50 | 17 | 0.42 | 67.42 | 74.16 | 25.22 | 0.62 | 100 | 65.73 | 31.96 | 0.91 | 98.60 | 1.0142 |
| 50 | 21.5 | 0.8 | 72.3 | 69.15 | 29.74 | 1.11 | 100 | 61.29 | 37.69 | 1.63 | 100.61 | 0.9939 |
| 50 | 25 | 1.2 | 76.2 | 65.62 | 32.81 | 1.57 | 100 | 58.16 | 41.58 | 2.31 | 102.05 | 0.9799 |
| 50 | 35.5 | 3 | 88.5 | 56.50 | 40.11 | 3.39 | 100 | 50.08 | 50.84 | 4.98 | 105.90 | 0.9443 |
| 50 | 39 | 4 | 93 | 53.76 | 41.94 | 4.30 | 100 | 47.65 | 53.21 | 6.31 | 107.17 | 0.9331 |
| 50 | 50 | 8 | 108 | 46.30 | 46.29 | 7.41 | 100 | 41.04 | 58.67 | 10.88 | 110.59 | 0.9042 |
| 50 | 54 | 10 | 114 | 43.86 | 47.37 | 8.77 | 100 | 38.88 | 60.04 | 12.88 | 111.80 | 0.8945 |
| 50 | 63 | 15 | 128 | 39.06 | 49.22 | 11.72 | 100 | 34.62 | 62.38 | 17.21 | 114.21 | 0.8756 |
| 50 | 81 | 30 | 161 | 31.06 | 50.31 | 18.63 | 100 | 27.53 | 63.76 | 27.36 | 118.65 | 0.8428 |
| 50 | 100 | 50 | 200 | 25.00 | 50.00 | 25.00 | 100 | 22.16 | 63.37 | 36.71 | 122.24 | 0.8181 |
| 50 | 128 | 100 | 278 | 17.99 | 46.04 | 35.97 | 100 | 15.95 | 58.35 | 52.82 | 127.12 | 0.7867 |
| 50 | 165 | 200 | 415 | 12.05 | 39.76 | 48.19 | 100 | 10.68 | 50.39 | 70.76 | 131.83 | 0.7586 |
| 50 | 210 | 400 | 660 | 7.57 | 31.82 | 60.61 | 100 | 6.71 | 40.33 | 89.00 | 136.04 | 0.7351 |
| 50 | 260 | 700 | 1010 | 4.95 | 25.74 | 69.31 | 100 | 4.39 | 32.62 | 101.78 | 138.79 | 0.7205 |
| 50 | 300 | 1000 | 1350 | 3.71 | 22.22 | 74.07 | 100 | 3.29 | 28.16 | 108.77 | 140.22 | 0.7132 |
| 50 | 380 | 2000 | 2430 | 2.06 | 15.64 | 82.30 | 100 | 1.83 | 19.82 | 120.85 | 142.50 | 0.7018 |
| 50 | 440 | 3000 | 3490 | 1.43 | 12.61 | 85.96 | 100 | 1.27 | 15.98 | 126.23 | 143.48 | 0.6970 |

*D = A + B + C   H = E + F + G   J = E ÷ 1.1282   K = F ÷ 0.789   L = G ÷ 0.681   M = J + K + L
E = A/D   F = B/D   G = C/D   N = H/M

TABLE 2

Solubility of Isoprene in Water and Isopropanol

| A | B | C | D* | E | F | G | H | J | K | L | M | N |
|---|---|---|---|---|---|---|---|---|---|---|---|---|
| Water Wt. | Isopropanol Wt. | Isoprene Wt. | Total Wt. | Water % | Isopropanol % | Isoprene % | Total % | Water Vol. | Isopropanol Vol. | Isoprene Vol. | Total Vol. | Density Wt./Vol. |
| 50 | 15 | 0.385 | 65.385 | 76.47 | 22.94 | 0.59 | 100 | 76.47 | 29.07 | 0.87 | 106.41 | 0.9398 |
| 50 | 20 | 0.8 | 71.8 | 69.64 | 29.25 | 1.11 | 100 | 69.64 | 37.07 | 1.63 | 108.34 | 0.9230 |
| 50 | 25 | 1.2 | 76.2 | 65.62 | 32.81 | 1.57 | 100 | 65.62 | 41.58 | 2.31 | 109.51 | 0.9132 |
| 50 | 38 | 3.0 | 91.0 | 54.94 | 41.76 | 3.30 | 100 | 54.94 | 52.93 | 4.85 | 112.72 | 0.8872 |
| 50 | 43 | 4.0 | 97.0 | 51.55 | 44.33 | 4.12 | 100 | 51.55 | 56.19 | 6.05 | 113.79 | 0.8788 |
| 50 | 58 | 8.0 | 116.0 | 43.10 | 50.00 | 6.90 | 100 | 43.10 | 63.37 | 10.13 | 116.60 | 0.8576 |
| 50 | 65 | 10 | 125 | 40.00 | 52.00 | 8.00 | 100 | 40.00 | 65.91 | 11.75 | 117.66 | 0.8499 |
| 50 | 76 | 15 | 141 | 35.46 | 53.90 | 10.64 | 100 | 35.46 | 68.31 | 15.62 | 119.39 | 0.8376 |
| 50 | 103 | 30 | 183 | 27.32 | 56.29 | 16.39 | 100 | 27.32 | 71.34 | 24.07 | 122.73 | 0.8148 |
| 50 | 130 | 50 | 230 | 21.74 | 56.52 | 21.74 | 100 | 21.74 | 71.63 | 31.92 | 125.29 | 0.7981 |
| 50 | 178 | 100 | 328 | 15.24 | 54.27 | 30.49 | 100 | 15.24 | 68.78 | 44.77 | 128.79 | 0.7765 |
| 50 | 240 | 200 | 490 | 10.20 | 48.98 | 40.82 | 100 | 10.20 | 62.08 | 59.94 | 132.22 | 0.7563 |
| 50 | 420 | 700 | 1170 | 4.27 | 35.90 | 59.83 | 100 | 4.27 | 45.50 | 86.86 | 136.63 | 0.7319 |
| 50 | 480 | 1000 | 1530 | 3.27 | 31.37 | 65.36 | 100 | 3.27 | 39.76 | 95.98 | 139.01 | 0.7194 |
| 50 | 660 | 2000 | 2710 | 1.85 | 24.35 | 73.80 | 100 | 1.85 | 30.86 | 108.37 | 141.08 | 0.7088 |
| 50 | 800 | 3000 | 3850 | 1.30 | 20.78 | 77.92 | 100 | 1.30 | 26.34 | 114.42 | 114.42 | 0.7039 |

*D = A + B + C;  E = C/D;  F = B/D;  G = C/D;  H = E + F + G;  J = E;  K = F ÷ 0.789;  L = G ÷ 0.681  M = J + K + L
N = H/M

TABLE 3

Solubility of Styrene in 35% Aqueous Hydrogen Peroxide and Isopropanol

| A | B | C | D* | E | F | G | H | J | K | L | M | N |
|---|---|---|---|---|---|---|---|---|---|---|---|---|
| 35% $H_2O_2$ Wt. | Isopropanol Wt. | Styrene Wt. | Total Wt. | 35% $H_2O_2$ % | Isopropanol % | Styrene % | Total % | 35% $H_2O_2$ Vol. | Isopropanol Vol. | Styrene Vol. | Total Vol. | Density Wt./Vol. |
| 50 | 10 | 0.1 | 60.1 | 83.19 | 16.64 | 0.17 | 100 | 73.74 | 21.09 | 0.19 | 95.02 | 1.0524 |
| 50 | 13 | 0.21 | 63.21 | 79.10 | 20.57 | 0.33 | 100 | 70.11 | 26.07 | 0.36 | 96.54 | 1.0358 |
| 50 | 15 | 0.3 | 65.3 | 76.57 | 22.97 | 0.46 | 100 | 67.87 | 29.11 | 0.51 | 97.49 | 1.0257 |
| 50 | 20 | 0.7 | 70.7 | 70.72 | 28.29 | 0.99 | 100 | 62.68 | 35.86 | 1.09 | 99.63 | 1.0037 |
| 50 | 23 | 1 | 74 | 67.57 | 31.08 | 1.35 | 100 | 59.89 | 39.39 | 1.49 | 100.77 | 0.9924 |
| 50 | 30 | 2 | 82 | 60.98 | 36.58 | 2.44 | 100 | 54.05 | 46.36 | 2.70 | 103.11 | 0.9698 |
| 50 | 38 | 4 | 92 | 54.35 | 41.30 | 4.35 | 100 | 48.17 | 52.34 | 4.79 | 105.30 | 0.9497 |
| 50 | 50 | 8.2 | 108.2 | 46.21 | 46.21 | 7.58 | 100 | 40.96 | 58.57 | 8.35 | 107.88 | 0.9270 |
| 50 | 60 | 14 | 124 | 40.32 | 48.39 | 11.29 | 100 | 35.74 | 61.33 | 12.44 | 109.51 | 0.9132 |
| 50 | 80 | 30 | 160 | 31.25 | 50.00 | 18.75 | 100 | 27.70 | 63.37 | 20.66 | 111.73 | 0.8950 |
| 50 | 100 | 58 | 208 | 24.04 | 48.08 | 27.88 | 100 | 21.31 | 60.94 | 30.73 | 112.98 | 0.8851 |
| 50 | 120 | 100 | 270 | 18.52 | 44.44 | 37.04 | 100 | 16.42 | 56.32 | 40.82 | 113.56 | 0.8806 |
| 50 | 160 | 210 | 420 | 11.90 | 38.10 | 50.00 | 100 | 10.55 | 48.29 | 55.10 | 113.94 | 0.8777 |
| 50 | 200 | 380 | 630 | 7.94 | 31.74 | 60.32 | 100 | 7.04 | 40.23 | 66.48 | 113.75 | 0.8791 |
| 50 | 250 | 700 | 1000 | 5.00 | 25.00 | 70.00 | 100 | 4.43 | 31.68 | 77.14 | 113.25 | 0.8830 |
| 50 | 275 | 1000 | 1325 | 3.77 | 20.76 | 75.47 | 100 | 3.34 | 26.31 | 83.17 | 112.82 | 0.8864 |
| 50 | 475 | 4000 | 4525 | 1.10 | 10.50 | 88.40 | 100 | 0.98 | 13.31 | 97.42 | 111.71 | 0.8952 |
| 50 | 600 | 7800 | 8450 | 0.59 | 7.10 | 92.31 | 100 | 0.52 | 8.99 | 101.73 | 111.24 | 0.8990 |

*D = A + B + C;  E = A/D;  F = B/D;  G = C/D;  H = E + F + G;  J = E ÷ 1.1282;  K = F ÷ 0.789;
L = G ÷ 0.9074;  M = J + K + L;  N = H/M

TABLE 4

Solubility of Styrene In Water and Isopropanol

| A | B | C | D* | E | F | G | H | J | K | L | M | N |
|---|---|---|---|---|---|---|---|---|---|---|---|---|
| Water Wt. | Isopropanol Wt. | Styrene Wt. | Total Wt. | Water % | Isopropanol % | Styrene % | Total % | Water Vol. | Isopropanol Vol. | Styrene Vol. | Total Vol. | Density Wt./Vol. |
| 50 | 11 | 0.12 | 61.12 | 81.80 | 18.00 | 0.20 | 100 | 81.80 | 22.81 | 0.22 | 104.83 | 0.9539 |
| 50 | 15 | 0.26 | 65.26 | 76.62 | 22.98 | 0.40 | 100 | 76.62 | 29.13 | 0.44 | 106.19 | 0.9417 |
| 50 | 20 | 0.52 | 70.52 | 70.90 | 28.36 | 0.74 | 100 | 70.90 | 35.94 | 0.82 | 107.66 | 0.9289 |
| 50 | 28 | 1.30 | 79.30 | 63.05 | 35.31 | 1.64 | 100 | 63.05 | 44.75 | 1.81 | 109.61 | 0.9123 |
| 50 | 34 | 2.1 | 86.10 | 58.07 | 39.49 | 2.44 | 100 | 58.07 | 50.05 | 2.69 | 110.81 | 0.9024 |
| 50 | 40 | 3.2 | 93.20 | 53.65 | 42.92 | 3.43 | 100 | 53.65 | 54.40 | 3.78 | 111.83 | 0.8942 |
| 50 | 58 | 8.0 | 116 | 43.10 | 50.00 | 6.90 | 100 | 43.10 | 63.37 | 7.60 | 114.07 | 0.8767 |
| 50 | 60 | 9.0 | 119 | 42.02 | 50.42 | 7.56 | 100 | 42.02 | 63.90 | 8.34 | 114.26 | 0.8752 |
| 50 | 85 | 22 | 157 | 31.85 | 54.14 | 14.01 | 100 | 31.85 | 68.62 | 15.44 | 115.91 | 0.8627 |
| 50 | 90 | 25 | 165 | 30.30 | 54.55 | 15.15 | 100 | 30.30 | 69.14 | 16.70 | 116.14 | 0.8610 |
| 50 | 100 | 32 | 182 | 27.47 | 54.95 | 17.58 | 100 | 27.47 | 69.65 | 19.37 | 116.49 | 0.8584 |
| 50 | 140 | 78 | 265 | 18.66 | 52.24 | 29.10 | 100 | 18.66 | 66.21 | 32.07 | 116.94 | 0.8551 |
| 50 | 160 | 110 | 320 | 15.63 | 50.00 | 34.37 | 100 | 15.63 | 63.37 | 37.88 | 116.88 | 0.8556 |
| 50 | 200 | 195 | 445 | 11.24 | 44.95 | 43.82 | 100 | 11.24 | 56.97 | 48.29 | 116.50 | 0.8584 |
| 50 | 270 | 400 | 620 | 6.95 | 37.50 | 54.55 | 100 | 6.95 | 47.53 | 61.22 | 115.70 | 0.8643 |

TABLE 4-continued

| A Water Wt. | B Isopropanol Wt. | C Styrene Wt. | D* Total Wt. | E Water % | F Isopropanol % | G Styrene % | H Total % | J Water Vol. | K Isopropanol Vol. | L Styrene Vol. | M Total Vol. | N Density Wt./Vol. |
|---|---|---|---|---|---|---|---|---|---|---|---|---|
| 50 | 300 | 540 | 890 | 5.62 | 33.71 | 60.67 | 100 | 5.62 | 42.72 | 66.86 | 115.20 | 0.8681 |
| 50 | 380 | 1000 | 1430 | 3.50 | 26.57 | 69.93 | 100 | 3.50 | 33.68 | 77.07 | 114.25 | 0.8753 |

*D = A + B + C;  E = A/D;  F = B/D;  G = C/D;  H = E + F + G;  J = E;  K = F ÷ 0.789;  L = G ÷ 0.9074;
M = J + K + L;  N = H/M

Figure 7:
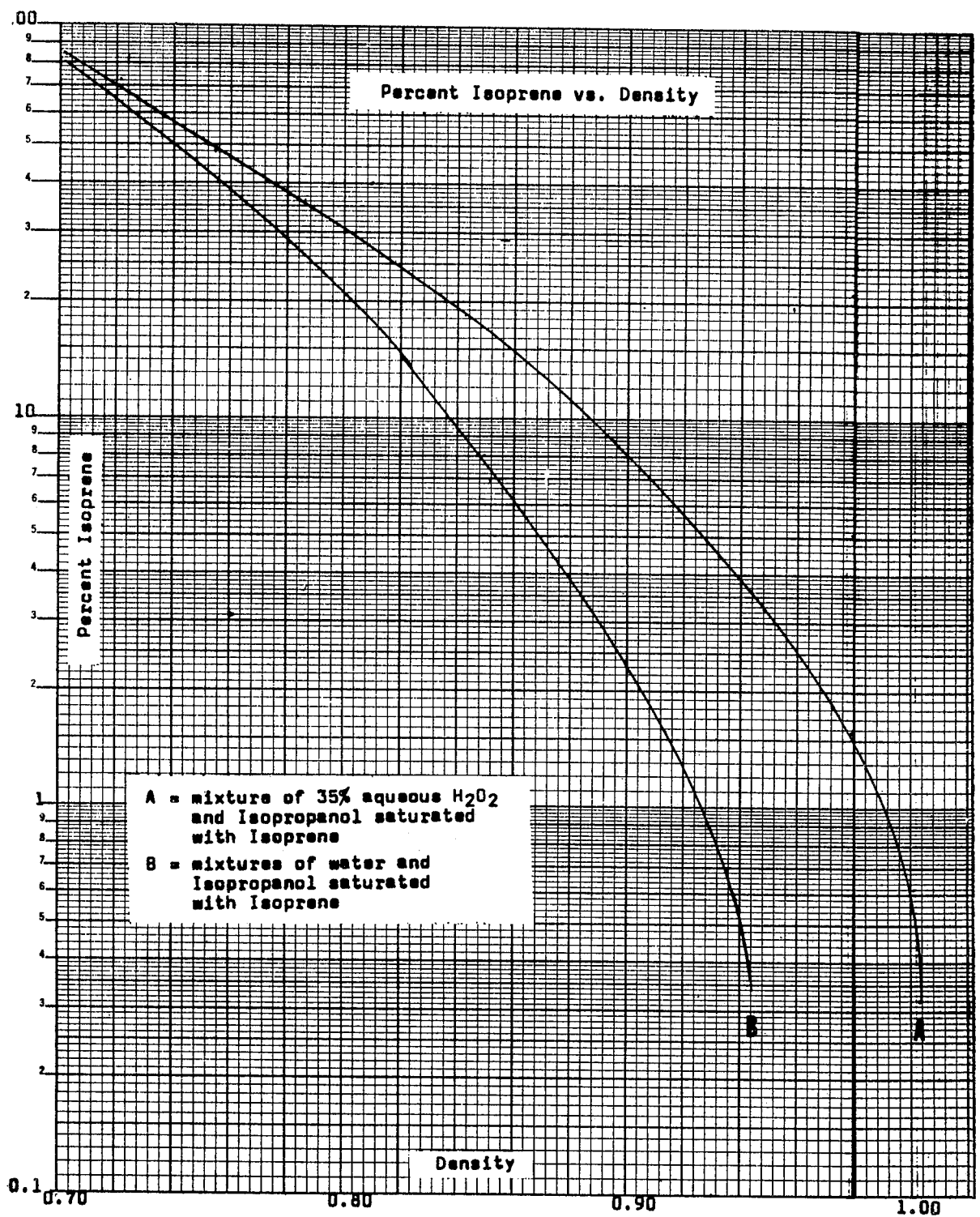
Figure 8:
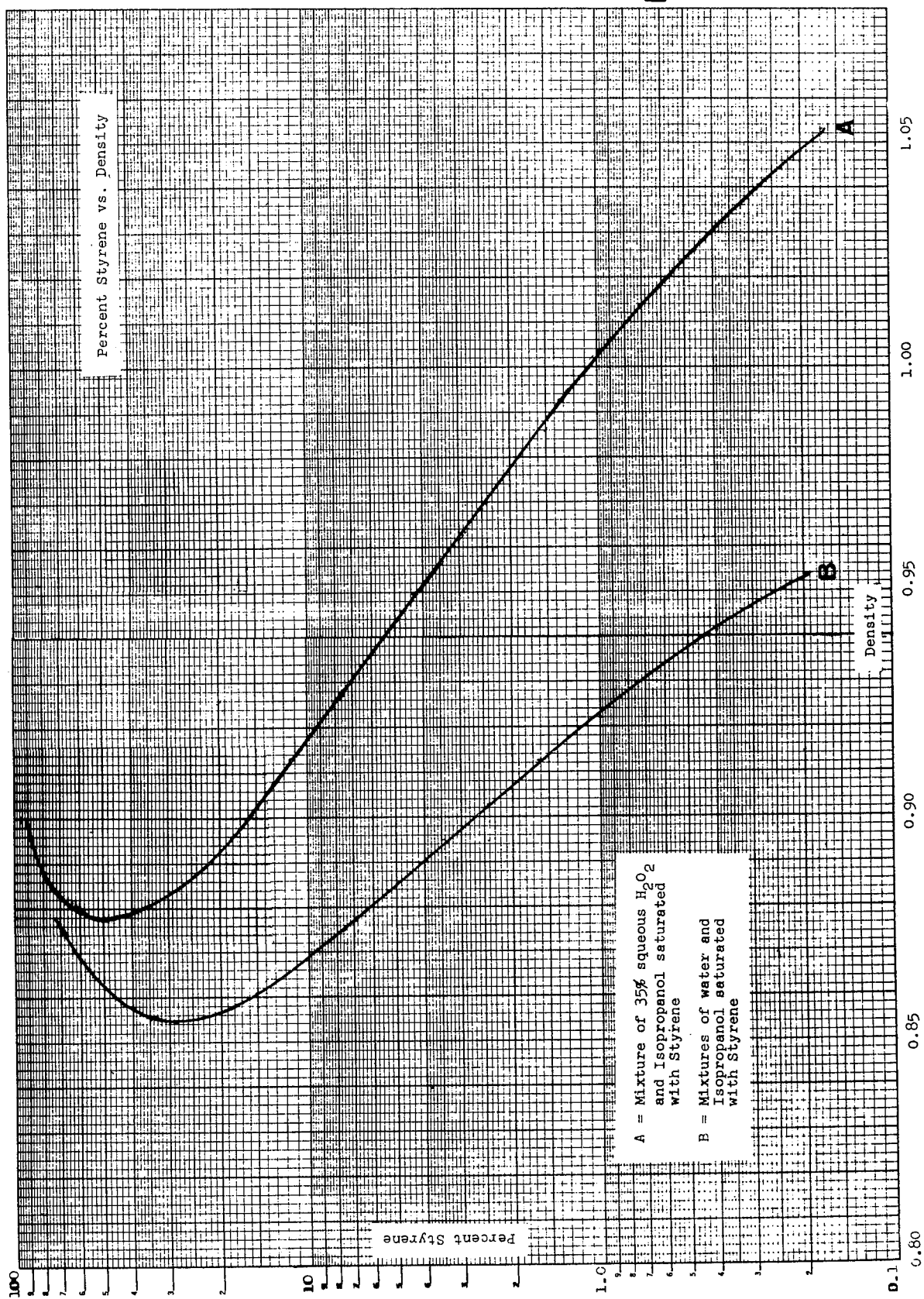
Figure 9:
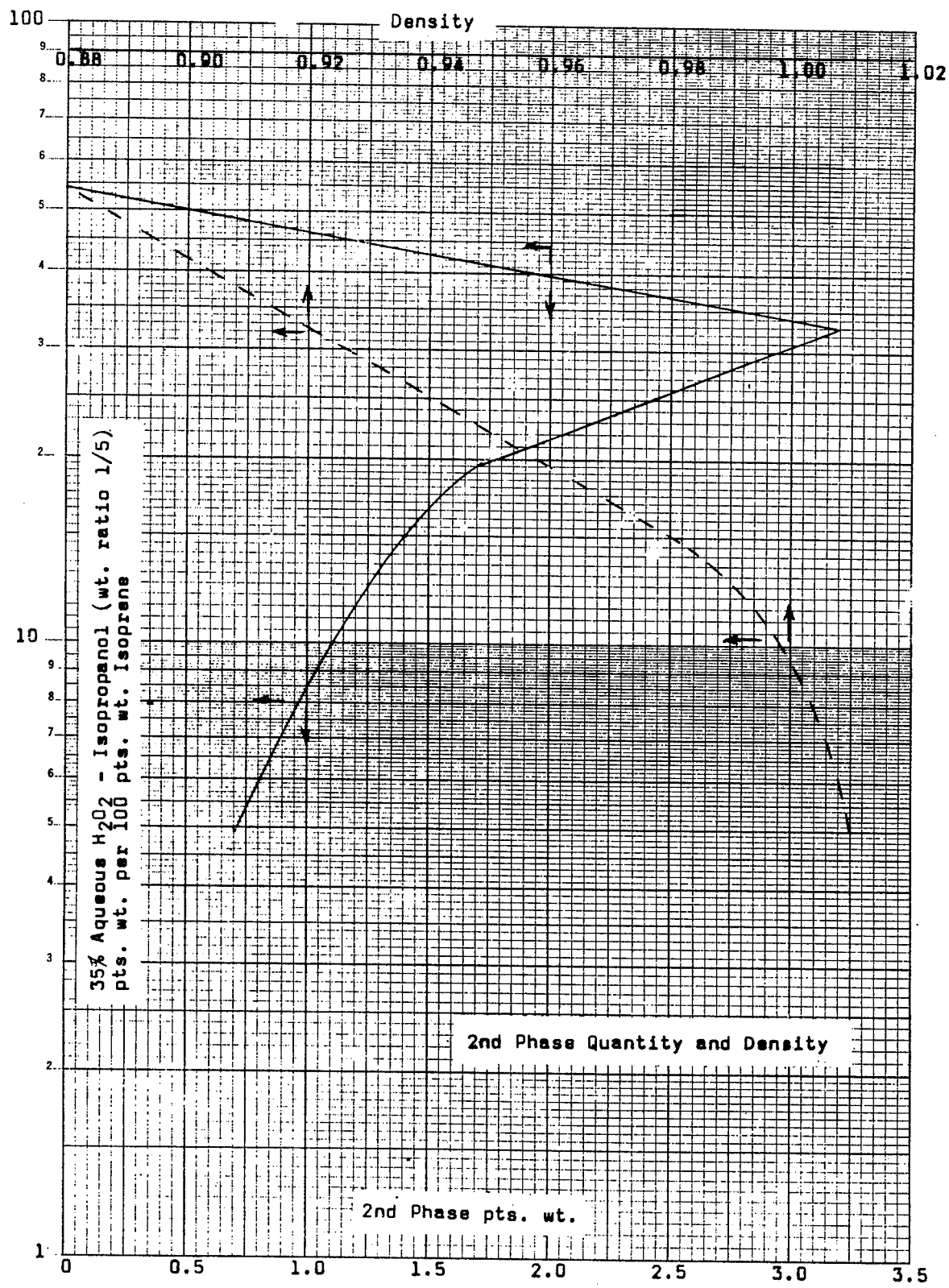
Figure 10:
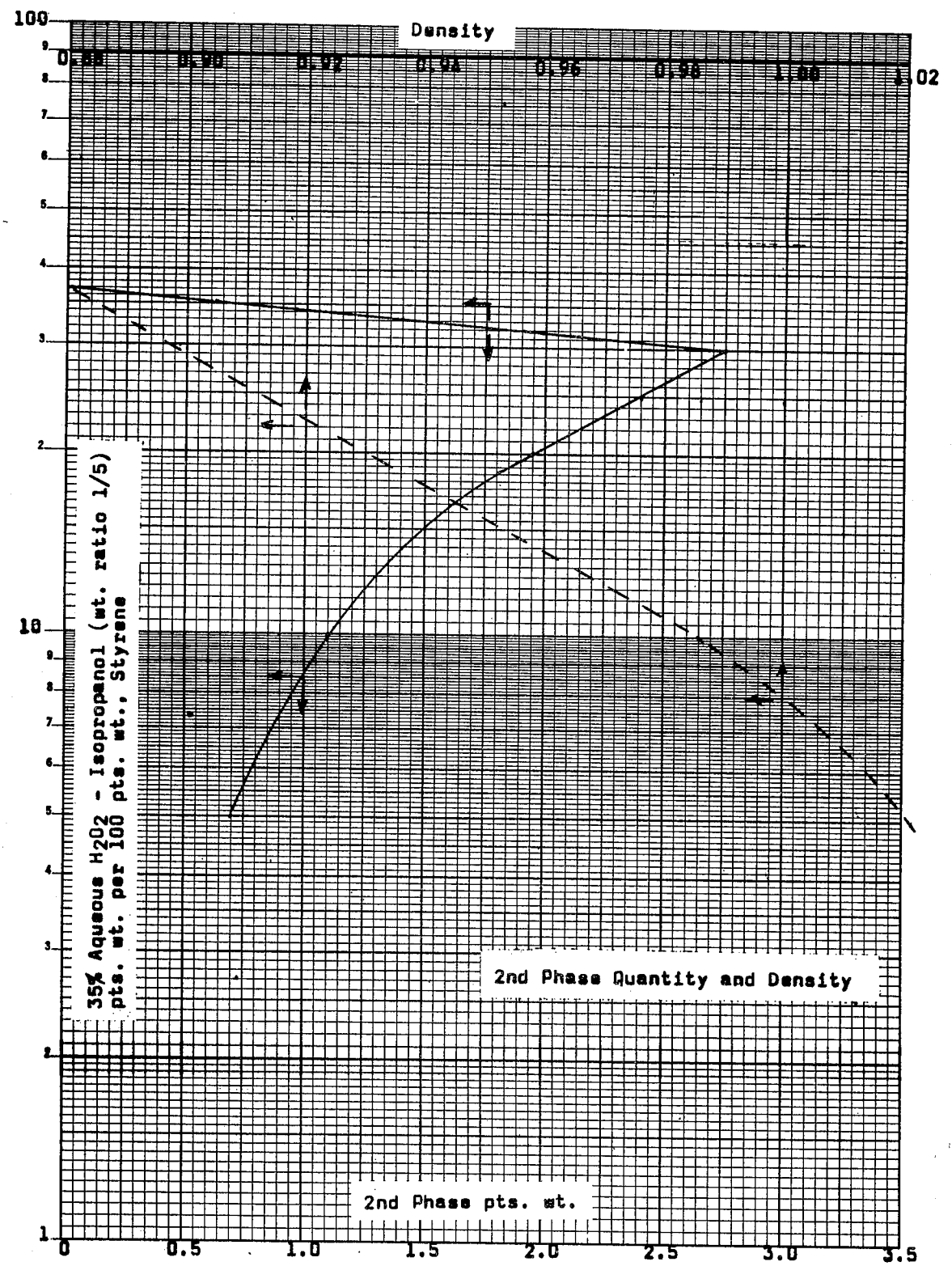

FIG. 7 shows the weight percent of isoprene required to saturate various mixtures of 35% hydrogen peroxide and isopropanol (plot A) and various mixtures of water and isopropanol (plot B), and the density values of the resulting solutions; the data being plotted from the values set forth in columns G and N of Tables 1 and 2, respectively;

FIG. 8 is similar to FIG. 7 with styrene employed in lieu of isoprene; the data of plots A and B being plotted from the values set forth in columns G and N of Tables 3 and 4, respectively;

FIG. 9 is a double chart which shows (solid curve) amounts of second phase formed when a composition of 35% aqueous hydrogen peroxide/isopropanol (weight ratio 1/5) is added in various weight proportions (parts by weight per 100 parts of isoprene) and (broken curve) the densities of the second phase solutions formed by such additions; and FIG. 10 is a similar double chart with 100 parts styrene substituted for the 100 parts isoprene used in FIG. 9.

A practical ratio of 35% aqueous hydrogen peroxide to isopropanol is a wt. ratio of 1 to 5, and amounts of 54 parts by weight or greater of this blend will form a single phase with 100 parts by weight of isoprene while lesser amounts will form two single phases. FIG. 9 gives the quantity and density of the second phase for such blends. It is to be noted that the maximum quantity of the second phase is 3.4 parts by weight and has a density of 0.918. This maximum amount of second phase occurs when about 33 parts by weight of the 1 to 5 blend is added to 100 parts by weight of the isoprene. According to FIG. 7, at the density of 0.918 the second phase contains in the range of about 1.4% to 5.8% by weight of isoprene. Thus the 3.4 parts by weight of second phase contains in the range of about 0.048 to 0.2 parts by weight of isoprene; while the 129.6 parts by weight of the principal phase contains over 99% by weight of the isoprene.

FIG. 10 is similar to FIG. 7 except the monomer is styrene instead of isoprene and the maximum quantity of second phase is 2.75 parts by weight when 30 parts of the 1 to 5 blend is added to the 100 parts of styrene, with a density of 0.897 which according to FIG. 8 contains in the range of about 3 to 17.5% by weight of styrene i.e. in the range of about 0.083 to 0.48 part by weight of styrene, while the principal phase contains 127.25 parts by weight and more than 99% by weight of the styrene.

DEFINITIONS

As used herein, the term "interpolymers" comprises the products produced by batch, continuous or intermittent polymerization in which a single monomer is polymerized in the presence of another polymer material or in which two or more monomers in the absence or presence of other polymer material are at least in part simultaneously, intermittently, or sequentially charged and simultaneously, intermittently, or sequentially polymerized; or in which the interpolymer is formed by a combination of these modes of polymerization; and when the components of an interpolymer are inseparable from one another, because chemically bonded to one another, then the polymer may be referred to as a copolymer, block polymer or graft polymer as the case may be.

As used herein, the term "ethylenically unsaturated monomer" denotes a monomer preferably of not more than 14 carbon atoms and containing and polymerizable through at least one >C = C< group with the aid of hydrogen peroxide, includes conjugated diene monomers having at least one >C=C-C=C< group, but excludes the conjugated and non-conjugated drying oils, modified drying oils, and their fatty acids. The term "vinylidene monomer" denotes an ethylenically unsaturated monomer containing at least one $CH_2$=C< group and includes "vinyl" monomer having at least one $CH_2$=CH- group but excludes conjugated diene monomers.

The monomers concerned include several categories of monomers, herein differentiated by their relative solubility to water. Since the solvent or solute relationships of hydrogen peroxide and aqueous hydrogen peroxide are relatively similar to those of water, the readily available water values afford a reasonable basis for classification.

As used here the term "monomers virtually insoluble to water" denotes ethylenicaly unsaturated monomers which at 20°C. do not dissolve more than 1.0 grams of water per 100 grams of monomer and comprises two classes of monomers: (a) the hydrocarbon monomers virtually insoluble to water and (b) the polar monomers virtually insoluble to water.

The "hydrocarbon monomers virtually insoluble to water" include hydrocarbon monomers generally, and comprise, but are not limited to, the typical examples set forth in Table A.

TABLE A

| Hydrocarbon Monomers Virtually Insoluble to Water | |
|---|---|
| Monomer | Solubility of Water in Monomer (1) |
| | (% by weight at 20°C.) |
| Hydrocarbon Conjugated Diene Monomers, e.g. | |
| Butadiene-1,3 | 0.06 |
| Isoprene | <0.1 |
| Piperylene | <0.1 |
| Hydrocarbon Vinylidene Monomers, e.g. | |
| Styrene | 0.06 |
| α-methylstyrene | 0.08 |
| Divinylbenzene (50% DVB) | 0.04 |

(1) as reported in literature

The "polar monomers virtually insoluble to water" which include, but are not limited to, the typical examples set forth in Table B, are separately classified because, in addition to carbon and hydrogen, these monomers contain other constituent material selected from the group consisting of oxygen, nitrogen, the halogens, silicon and in some instances sulfur and phosphorous atoms, and combinations of the foregoing.

TABLE B

| Polar Monomers Virtually Insoluble to Water | |
|---|---|
| Monomer | Solubility of Water in Monomer (1) |
| | (% by weight at 20°C.) |
| Vinyl chloride | 0.11 (2) |
| Vinylidene chloride | 0.55 (2) |
| Vinyl acetate | 1.0 |
| Vinylidene fluoride | 0.5 |
| Vinyl propionate | 0.60 |
| Vinyl butyrate | 0.3 |
| Vinyl 2-ethylhexoate | 0.2 |
| Vinyl acetylene | 0.67 |
| n-butyl acrylate | 0.7 |
| 2-ethylhexyl acrylate | 0.14 |
| n-phenylmaleic acid | 0.1 |
| 2-ethyl-3-propyl acrylic acid | 0.42 |
| Vinyl methyl ether | 0.38 |
| Vinyl ethyl ether | 0.2 |
| Vinyl butyl ether | 0.09 |
| Vinyl isobutyl ether | 0.08 |
| Triallyl cyanurate | 1.0 |
| 2-chlorobutadiene-1,3 | 1.0 |

(1) as reported in literature
(2) wt. % solubility in water at 25°C.

As used herein the term "monomers substantially insoluble to water" connotes those polar monomers containing carbon, hydrogen, and other constituent material which at 20°C. dissolved over 1.0 grams of water per 100 grams of monomer, but not over 3.5 grams of water per 100 grams of monomer. Such monomers include, but are not limited to the typical examples set forth in Table C.

TABLE C

| Monomers Substantially Insoluble to Water | |
|---|---|
| Monomers | Solubility of Water in Monomers (1) |
| | (% by weight at 20°C.) |
| Methacrolein | 1.7 |
| Acrylonitrile | 3.2 |
| Methyl methacrylate | 1.15 |
| Ethyl acrylate | 1.51 |
| Methyl acrylate | 2.32 |
| Vinyl crotonate | 1.1 |
| Isopropenyl acetate | 1.21 |
| Methyl isopropenyl ketone | 3.0 |

(1) as reported in literature

As herein used, the term "monomes essentially insoluble to water" connotes collectively the monomers which are either virtually insoluble to water or substantially insoluble to water as above defined.

The term "monomers soluble to water" as herein used, denotes the polar monomers which are soluble to water to an extent greater than the monomers essentially insoluble to water. Such monomers include, but are not restricted to, the typical examples set forth in Table D.

TABLE D

| Polar Monomers Soluble to Water | |
|---|---|
| Monomers | Solubility (1) g. monomer/100 g. water) |
| Acrylic acid | sol. water |
| Methacrylic acid | sol. hot water |
| Acrylamide | 204 |
| Maleic acid | 392 |
| Acrolein | 20.8 |

(1) as reported in literature.

The term "drying oils" connotes the unsaturated vegetable oils and the unsaturated fish oils which oils are capable of forming films by oxidation on exposure to air and further includes these oils in their raw state, in bodied form and/or otherwise modified, as by air blowing. The term "drying oil substances" includes (1) the drying oils, especially those containing conjugated unsaturation e.g., tung oil, oiticica oil, isano oil, conjugated linseed oil, conjugated soya bean oils, fish oil, etc., (2) the air blown or bodied drying oils, whether from conjugated or non-conjugated drying oils and whether bodied by heat and/or catalytically, (3) the fatty acids including their dimers, trimers and tetramers derived from such drying or modified drying oils.

The term "hydrogen peroxide" as used herein includes aqueous hydrogen peroxide and comprises several distinct categories or ranges of the latter having different characteristics and utilities as set forth in Table E. For the purposes of this invention categories (b), (c)(1) and (c)(2)in this table constitutes the preferred range, while categories (c)(1) and (c)(2) constitute the more preferred nonhazardous range, and category (c)(1) constitutes the most preferred range. Hydrogen peroxide on a water free basis is designated hydrogen peroxide (100% basis).

The hydrogen peroxide employed may be produced by any of the known processes and may contain small amounts of organic or inorganic impurities provided such are not deleterious to the stability of the hydrogen peroxide. The mutual solvent-diluent and hydrogen peroxide when produced by contacting an isoalcohol e.g. isopropanol with oxygen or air and decomposing same by heating does contain an appreciable quantity of ketone, e.g. acetone and usually a minor amount of carboxylic acid, e.g., acetic acid, and the resulting mixture may also be employed in the practice of the present invention.

TABLE E

| Category | $H_2O_2$ Range (wt. %) | Wt. % $H_2O_2$ | Wt. %, $H_2O$ | Moles $H_2O_2$ Moles $H_2O$ | Characteristics | Utilities | |
|---|---|---|---|---|---|---|---|
| (a) | >99 to 80 | ≡100 | ≡0 | ≡1.0 : 0.0 | Possibly | (a) | Hazardous in preSence of organic material when conc. |
| | | >80 | <20 | 1.0 : <0.5 | Explosive | | |
| (b) | 80 to 54.2 | 80 | 20 | 1.0 : 0.5 | Range | (b) | Hazardous in presence of organic material where at about stoichiometric proportions |
| | | >54.2 | <45.8 | 1.0 : <1.5 | | | |
| (c)(1) | 54.2 to 48.5 | 54.2 | 45.8 | 1.0 : 1.5 | Non Hazardous | (c) | (1) non-hazardous |

TABLE E-continued

| Category | $H_2O_2$ Range (wt. %) | Wt. % $H_2O_2$ | Wt. %, $H_2O$ | Categories of Hydrogen Peroxide Moles $H_2O_2$ Moles $H_2O$ | Characteristics | | Utilities |
|---|---|---|---|---|---|---|---|
| (c)(2) | <48.5 to 33.1 | 48.5 <48.5 33.1 | 51.5 >51.5 66.9 | 1 : 2 1 : >2 1 : 4 | Preferred Range | (c) | and highly effective (2) non-hazardous and less effective |
| (d)(1) | <33.1 to 15.9 | <33.1 15.9 | >66.9 84.1 | 1 :>4 1 : 10 | Less Effective | (d) | (1) not so practical |
| (d)(2) | <15.9 to 6.0 | <15.9 6.0 | >84.1 94.0 | 1 : >10 1 : 30 | Range | (d) | (2) virtually impractical |

As used herein the term "mutual solvent-diluent" denotes liquid organic diluent material which is a sufficient solvent for the drying oil substance and monomer materials employed and also for hydrogen peroxide and any water present, so that in the combination of components employed the drying oil substance, the monomers, the hydrogen peroxide, and the mutual solvent-diluent form two individually homogeneous intraphase polymerization systems, each containing all said components. In preferred embodiments of this invention, the mutual solvent-diluent is one which is miscible in all proportions with the selected monomer material and drying oil substance, and miscible in all proportions with the aqueous hydrogen peroxide. While termed a mutual solvent-diluent herein in accordance with its initial utility, these liquid organic materials assist in the production of controlled molecular weight polymer by the elevated temperature polymerization. The water soluble alcohols are poor solvents to the polymers produced which renders them readily removable from the polymers. As mutual solvent-diluent may be employed mixtures of mutual solvent-diluents and solvents for either the monomer material or the hydrogen peroxide and such solvent mixtures may be azeotropic mixtures.

General Procedure

The preferred procedures employed for effecting the polymerizations according to this invention, and which have been used in preparing the examples hereinafter set forth with such modifications as are set forth therein, are as follows:

Combining Essential Ingredients

The essential ingredients employed in the polymerization recipe are the drying oil substance when used, the monomer material, hydrogen peroxide, water and the mutual solvent-diluent therefor. As will be appreciated from Table E above, the process of this invention should be carried out so as to avoid having hydrogen peroxide and organic material combined in detonable relation at any time. Accordingly, when hydrogen peroxide is employed in the range of category (a), above 80 to over 99% hydrogen peroxide should be diluted by adding to approximately 2 to 3 volumes or more of the mutual solvent-diluent, to prepare a safe solution to combine with the monomer; or be prepared in situ by air oxidation of a secondary alcohol; or be combined in more dilute aqueous solution.

Likewise, in using aqueous hydrogen peroxide of category (b) Table E, while this category is less hazardous, similar precautions are preferably employed.

When the aqueous hydrogen peroxide falls in categories (c)(1) and (c)(2) constituting the preferred range, Table E, it is less critical in what order the essential ingredients are combined. This same comment applies to the more dilute substantially less effective ranges, categories (d)(1) and (d)(2), in the latter of which the presence of excessive water and consequential presence of excessive mutual solvent-diluent can unduly retard the polymerization and/or overburden the polymer recovery operation.

For the most part in the examples, 50% or 35% by weight aqueous hydrogen peroxide from category (c), Table E, has been employed. For forming the combination of two single intraphase polymerization systems in accordance with this invention the proportions may be varied within limits as typified in FIG. 2, hereinbefore described, to any extent which with the particular ingredients enables the formation of a product having its number average molecular weight in the range of 500 to 10,000, and for purposes of facilitating control it is preferred to in any event employ at least 5 parts by weight of mutual solvent-diluent for each 100 parts by weight of the monomer and any drying oil substance to be charged.

The proportions of the hydrogen peroxide to be used should be in the range of 0.5 to 10 parts by weight, preferably 1.0 to 5 parts by weight, and most preferably 2.0 to 4 parts by weight, based on hydrogen peroxide (100%) content, per 100 parts by weight of the monomer material and any drying oil substance charged.

Antioxidants

The monomers to be polymerized, more particularly described hereinbefore and hereinafter, can be charged free of stabilizer and/or antioxidants. In the examples of preparation of polybutadiene according to this invention, the monomers are distilled and hence freed of stabilizer. In examples employing isoprene and/or piperylene and/or vinylene monomers, however, the monomers used in the examples were not freed of stabilizers. Thus the invention may be practiced either in the presence or the absence of stabilizers, antioxidants or inhibitors.

Non-Mutual Solvent-Diluents, and Modifiers

Similarly, monomers may be employed which are not completely pure and which may contain substantial quantities of non-polymerizable organic material, and such material may constitute either a mutual solvent-diluent or may be a non-mutual solvent-diluent in which event the quantity of mutual solvent-diluent to be employed may be reduced or increased to assure proper balance of the systems. In like manner, when desired non-mutual solvent-diluents for either the monomer or the aqueous hydrogen peroxide, or both, may be employed, to facilitate the process or aid in controlling the molecular weight. Thus the invention may be practiced in the presence or absence of nonmutual solvent-diluents.

Further to aid in controlling molecular weights when desired, in addition to increasing the polymerization temperature, increased quantities of hydrogen peroxide may be employed, and/or modifiers may be added.

To minimize decomposition of hydrogen peroxide in constructing the reactor system for use in the present process only materials which do not appreciably decompose hydrogen peroxide should be used, such as glass, ceramic ware, tin, aluminum or stainless steel (e.g. "300 type" stainless steel). Thus the inner surface of the reaction vessel is preferably constructed of or lined with aluminum, an aluminum alloy, tin, stainless steel, glass, enamel, procelain or like predominatly silicious material or coated with a resin or other material in contact with which hydrogen peroxide is relatively stable. The inner surface of the reactor, when composed of glass or like silicious material, may be treated with a suitable compound of boron, such as boric acid, or the inner surface may be an acidic enamel, Where the reaction vessel is constructed of or lined with stainless steel, or aluminum, it is desirable to passivate the equipment by known methods, e.g., new equipment of stainless steel may be and preferably is thoroughly cleaned and then passivated by treatment with a strong volatile oxidizing agent, preferably hot 15 to 50% by weight nitric acid and hot 30 to 60% aqueous hydrogen peroxide in succession.

To further inhibit the decomposition of hydrogen peroxide during the polymerization reaction there may be included in the recipes hereof in minor amounts one or more hydrogen peroxide stabilizers. The hydrogen peroxide stabilizers that are employed in accordance with the invention all are compounds that sequester, that is segregate, abstract, withdraw or envelope, substances that tend to catalyze the decomposition of hydrogen peroxide to water and oxygen, particularly ions of heavy metals, such as the ferric, the cupric, and the chromic ion. As stabilizers there may be used, for example, any known organic hydrogen peroxide stabilizers which will not unduely contaminate the products such as cyanides, alpha-hydroxy-quinoline, acetanilide, benzoic acid, alphabenzoyloxy-beta-dimethylaminobutyric acid, glycerine phenyl ether, thiourea, sodium salicylate, thymol, gum arabic, albumin, uric acid, guaiacol, phosphatides, acetylglycol, monoacetyl glycol ether, sodium benzene sulfonate, hexamethylenetetramine, and others, as well as such inorganic hydrogen peroxide stabilizers as oxy acids of phosphorous and their salts, such as trisodium orthophosphate, disodium monohydrogen orthophosphate, monosodium dihydrogen orthophosphate, orthophosphoric acid, sodium phyrophosphate, potassium pyrophosphate, potassium dihydrogen orthophosphate, sodium hypophosphate, sodium metaphosphate, pyrophosphoric acid and metaphosphoric acid; compounds of tin, antimony, silicon, boron, or aluminum, such as sodium aluminate, sodium silicate, sodium metastannate, alpha-metastannic acid, hydrous antimony oxide, freshly presipitated alumina, freshly precipitated silica, silicic acid hydrosol, hydrous stannic oxide and tin-pyrophosphoric acid compounds.

Sodium borate, borax, boric acid, boric oxide, boric acid esters can also be used as inhibitors herein. Hydrogen peroxide is more stable in acid solutions and therefor acids may be employed to aid in stabilization such as the phosphoric acids, acetic acid, oxalic acid, glutaric acid, p-toluene-sulfonic acid, benzenephosphonic acid, adipic acid, and the like. Acidic salts, such as potassium acid phosphate and sodium acid sulfate, and also buffer mixtures of a plurality of salts or of an acid and a salt, may be employed.

From the foregoing, it will be appreciated that the present invention, in its broader aspects, may be practiced with or without hydrogen peroxide stabilizers.

Reactors and Addition of Materials Thereto

The reactor may be a tubular reactor, or a vessel type reactor preferably with agitation and the polymerization may be carried out batchwise, continuously or intermittently.

The hydrogen peroxide may be added at the beginning of the reaction or both at the beginning and during the reaction. The monomer material may be added before, concurrently with or after the other ingredients as above indicated, or even a part of the monomer material may be added after the polymerization has commenced.

Monomer Material

The monomer materials employable separately or in various combinations in the practice of the invention comprise, inter alia, conjugated diene monomers and other monomers containing and polymerizable through one or more $>C=C<$ groups with the aid of hydrogen peroxide and in addition to those mentioned heretofor and in the examples may be selected from the following classes of monomers of which the examples set forth are illustrative; *hydrocarbon conjugated dienes* such as butadiene-1,3, isoprene, 2,3-dimethylbutadiene-1,4, piperylene, pentadiene-1,3, 2-phenyl-butadiene-1,3, and the like; *the polar conjugated dienes* such as 1- and 2-cyano-butadiene-1,3, 2-chlorobutadiene-1,3 and the like; (it is to be noted that the term conjugated dienes including whether hydrocarbon or polar excludes conjugated dienes having ester groups and/or carboxyl groups such as found in the drying oils and the fatty acids derived therefrom the olefin monomers such as ethylene; *vinyl, vinylidene and allyl aromatic monomers* such as styrene, the vinyl toluenes, the methyl styrenes, the ethyl styrenes, the propyl styrenes, the vinyl biphenyls, the vinyl biphenyl ethers, the vinyl naphthalenes, the $\alpha$ and/or $\beta$ substituted vinyl aromatics such as $\alpha$-methyl styrene, isopropenyl biphenyl, isopropenyl biphenyl oxide and the like; the substituted vinyl, allyl or vinylidene aromatics including the alkyl, phenyl, alkoxy, phenoxy, acetyl, acylamino, isocyanate, carbamide, amido, amino, nitrile, carboxyamido, trifluoromethyl, phosphoro, and halo (F, Cl, Br) substituents including the mono, di, tri, and tetra chloro styrenes, the fluorostyrenes, the chlorovinyl toluenes, the fluorovinyl toluenes, the cyano styrenes and the like monomers; *esters of olefinic acids including $\alpha$ and $\beta$ substituted olefinic acids and including alkyl, alkenyl, aryl, aralkyl esters* such as the methyl, ethyl, propyl, butyl, isobutyl, pentyl, hexyl, cyclohexyl, phenyl esters of acrylic, methacrylic ethacrylic, and the like; and including the $\alpha$-haloacrylates such as methyl $\alpha$-chloroacrylate, propyl $\alpha$-chloroacrylate and the like; *the esters of olefinic alcohols with saturated acids*, such as allyl, methallyl, crotyl, 1-chloroallyl, 2-chloroallyl, cinnamyl, vinyl, methylvinyl, 1-phenylallyl, butenyl and the like esters of saturated aliphatic and aromatic monobasic acids as vinyl and allyl acetate, isopropenyl acetate, vinyl formate, vinyl-2-ethyl hexoate, methyl vinyl-acetate, vinyl and allyl propionate, n-butyrate and isopropenyl propionate, isopropenyl butyrate, vinyl and allyl benzoate, and the like; the dialkyl esters of olefinic dicarboxylic acids such as the dialkyl esters and mixed dialkyl esters from such alkyls as methyl, ethyl, propyl, and the like through $C_5$, of the olefinic dicarboxylic acids including maleic, citraconic, itaconic, muconic, glutaconic, fumaric and derivatives of these esters such as diethyl-chloromaleate and the like; olefinic acid esters of epoxy alcohols, such as 2,3-epoxypropyl methacrylate or acrylate, glycidyl methacrylate, glycidyl acrylate, glycidyl crotonate, benzene vinyl monoepoxide and the reaction products of such with amines, as trimethyl amine and the like; olefinic acid esters of fluoro alcohols such as the $\alpha$-trifluoromethyl acrylic acid esters such as the methyl or ethyl ester or the ester of prefluoroethanol or the partially fluorinated alcohols, that is the fluoroalkanols such as octafluoropentanol and the like; the olefinic halides, such as vinyl fluoride, vinyl chloride, vinyl bromide, vinylidene fluoride, vinylidene chloride, allyl fluoride, allyl chloride, $\alpha$-methallyl fluoride, $\alpha$-methallyl chloride, $\alpha$-ethallyl fluoride or chloride or bromide, tetrafluoroethylene, trifluorochloroethylene, dichloridifluoroethylene, trichlorofluoroethylene, perfluoropropylene, 1-phenyl-1,2 difluoroethylene, trichloroethylene and the like; the alkenyl ketones such as methyl vinyl ketone, isopropenyl methyl ketone, allyl methyl ketone, mesityl oxide, allyl phenyl ketone and the like; the olefinic ethers such as vinyl ethyl ether, vinyl butyl ether, vinyl cyclohexyl ether, vinyl phenyl ether, vinyl tolyl ether, vinyl benzyl ether, methyl isopropenyl ether, allyl ethyl ether, methallyl ethyl ether, chloroallyl ethyl ether and the like; the olefinic aldehydes such as acrolein, methacrolein, crotonaldehyde and the like; the amino olefinic ethers such as the amino vinyl ethers including aminoethylvinyl ether, N-ethylaminoethylvinyl ether, aminopropylvinyl ether, N-methylaminoethylvinyl ether, N,N-diethylaminoethylvinyl ether and the like; the olefinic amines, such allyl amines as N,N-dimethyl allylamine, N,N-diethyl, dipropyl, dibutyl, diisobutyl, diphenyl and similar allylamines and N-allyl morpholine, N-allylpyridine, N-allylethyleneimine and the like; nitrogen containing esters of olefinic acids such as aminocyclohexyl methacrylate triethanolamine monomethacrylate, $\beta$-piperidyl-N-ethyl methacrylate $\beta$-morpholine-N-ethyl methacrylate, N-methacrylyl morpholine, N-methacrylyl thiomorpholine, N-methacrylyl piperidines, N-acrylyl morpholine, N-acrylyl thiomorpholine, N-acrylyl piperidine and the like; the quaternary ammonium monomers, including methacryloxyethyltrimethylammonium methylsulfate and various quaternizing reaction products of quaternizing agents such as alkyl halides, alkyl sulfonates, alkyl phosphates and the like (e.g. methyl bromide and toluene sulfonate) with tertiary amine monomers such as $\beta$-dimethylaminoethyl methacrylate, methyl $\alpha$-diethyl aminoacrylate, methyl $\alpha$-(N-methylanilino)-acrylate, methyl $\alpha$-dibenzylaminoacrylate, methyl $\alpha$-distearylamino acrylate and the like; the monoolefinic triazine monomers including triazine monomers in which one of the carbons of the triazine ring is attached to a vinyl, allyl, methallyl, crotyl, 1-chloroallyl, 2-chlorallyl, cinnamyl, butenyl radical or the like and the other carbons of the triazine are attached to cyano, halo (F, Cl, Br), amino, alkoxy, cycloaliphatic (e.g. cyclopentyl, cyclohexyl, etc.), aromatic-substituent (e.g. phenyl, biphenyl, naphthyl, etc.), alkylaryl (e.g. tolyl, xylyl, ethylphenyl, etc.) halogenated aromatic and the like; the N-vinyl and allyl guanidines and including allyl melamine, allyl isomelamine and the like; the N-vinyl-N-alkylguanidines such as N-vinyl-N-n-butylguanidine, N-vinyl-N-benzyl guanidine, acryloguanamine, methacryloguanamine and the like; the N-vinyl monomers such as N-vinylpyrrole, N-vinyl carbazole, N-vinylindole, N-vinyl succinimide and the like; N-vinyl lactams such as N-vinyl caprolactam, N-vinyl butyrolactum and the like; the amides and substituted amides of acrylic acid and $\alpha$ and $\beta$-substituted acrylic acids such as acrylamide, methacrylamide, ethacrylamide, N-methacrylamide, N-methylmethacrylamide, N,N-bis (hydroxyethyl) acrylamide, N,N-diethylacrylamide, N,N-ethylmethylacrylamide and other mono- and di- N substituted unsaturated acid amides where the substituent is $C_1$ to $C_5$ alkyl alkoxy, haloalkyl and the like; the olefinic nitriles such as acrylonitrile, methacrylonitrile, ethacrylonitrile, chloroacrylonitrile and the like; the fluoro-substituted nitriles of olefinic acids such as N- (2,2,3-trifluoroethyl) acrylamide, methacrylamide, N- (2,2-difluoroethyl) acrylamide and methacrylamide; the acylamino substituted acrylic and $\alpha$ and $\beta$-acrylic acid esters such as the methyl, ethyl, propyl and the like alkyl esters of $\alpha$-acetoaminoacrylate, $\alpha$-N-butyl-aminoacrylate and the like; the vinyl pyridines such as 2-vinyl pyridine, 3-vinylpyridine, 4-vinylpyridine, 2-vinyl-5-ethylpyridine, 2-methyl-5-vinylpyridine and the other ethyl and methyl isomers of vinylpyridine and the like; the vinyl heterocyclic compounds such as 2-vinylfuran and 2-vinylthiophene and the like; the silicon containing monomers such as silicon tetra-acrylate, silicon tetra-methacrylate, vinyltrichlorosilane and its hydrolysis products, the vinyl and allyl silicates and the like; the phosphorus containing monomers such as acrylic esters containing phosphonamido groups such as diamidophophoroacrylate and the like and other similar polymerizable materials having a polymerizable unsaturated carbon-to-carbon bond; the olefinic acids and their derivatives such as acrylic acid and the alpha and/or beta alkyl, aryl, and alkaryl substituted acrylic acids such as the methyl, ethyl, propyl, butyl, isobutyl, phenyl, tolyl and the like alpha and/or beta substituted acrylic acids including $\alpha$-methacrylic acid, $\alpha$-ethacrylic acid, $\alpha$-propylacrylic acid, $\alpha$-butylacrylic acid and $\alpha$-phenylacrylic acid, and the like, and further including the oxy, hydroxy and halogen, including the fluoro, chloro, and bromo derivatives of these olefinic acids and substituted olefinic acids and the like; the half alkenyl esters of saturated dicarboxylic acids such as the vinyl, vinylidene and allyl half ester of such saturated dicarboxylic acids as oxalic, malonic, succinic, glutaric, adipic, tartaric, citric, phthalic and the like; the olefinic dicarboxylic and their acid anhydrides and the half alkyl, aryl or alkaryl esters of olefinic dicarboxylic acids such as maleic, citraconic, itaconic, mesaconic, fumaric, muconic and similar acids including their acid anhydrides such as maleic anhydride and the like and the alkyl and aryl half esters of these olefinic dicarboxylic acids like monoethyl fumarate, monomethyl itaconate and the halo-derivatives of these such as chloromaleic anhydride; the olefinic nitrile and other polymerizable olefinic nitriles and these can be polymerized and can then have their cyano groups converted to carboxyl groups by saponification with a strong alkali such as sodium hydroxide or potassium hydroxide; monomers having a plurality of polymerizable unsaturated carbon-to-carbon bonds at least two of which are non-conjugated, and include: the polyunsaturated esters of olefinic alcohols and unsaturated mono-carboxylic acids such as the vinyl, vinylidene, and allyl, methallyl, crotyl, 1-chloroallyl, 2-chloroally, cinnamyl, methyl vinyl, 1-phenyl allyl, butenyl esters of unsaturated monocarboxylic acids such as vinyl acrylate, allyl acrylate, the vinyl and allyl esters of $\alpha 0$ and $\beta$ substituted acrylates such as vinyl methacrylate, vinyl crotonate, vinyl ethacrylate, allyl methacrylate, allyl ethacrylate, vinyl $\alpha$-chloroacrylate, allyl $\alpha$-hydroxyethyl acrylate, and the like; the polyunsaturated esters of saturated dicarboxylic and polycarboxylic acids such as the vinyl, vinylidene, allyl, methallyl, crotyl, 1-chloroallyl, 2-chloroallyl, cinnamyl, methyl vinyl, 1-phenyl allyl, butenyl esters and mixed esters of such dicarboxylic acids as oxalic, malonic, succinic, glutaric, adipic, tartaric, citric, and the like including such monomers as diallyl oxylate, diallyl sebacate, diallyl adipate, diallyl succinate, diallyl malonate, triallyl citrate and the like; polyunsaturated esters of unsaturated polycarboxylic acids, such as the vinyl, vinylidene, allyl, ethallyl, crotyl, 1-chloroallyl, 2-chloroallyl, cinnamyl, methyl vinyl, 1-phenyl allyl, butenyl esters and mixed esters of the unsaturated polycarboxylic acids such as maleic, citraconic itaconic, mesaconic, fumaric, muconic, chloromaleic, aconitic and the like including such monomers as diallyl fumarate, diallyl homophthalate, diallyl itaconate, diallyl ester of muconic acid, diallyl maleate, diallyl phthalate, diallyl isophthalate, diallyl terephthalate, triallyl aconitate and the like; polyhydroxy esters of unsaturated acids such as the glycol esters, glycol ether esters, the trihydroxy-, tetrahydroxy-, pentahydroxy-, hexahydroxy- esters including the glycerides, the pentoses, the hexoses esters of acrylic acid and $\alpha$ and $\beta$-substituted acrylic acid such as ethylene diacrylate, ethylene dimethacrylate, propylene dimethacrylate, glycerol dimethacrylate, glyceryl trimethacrylate, tetramethylene diacrylate and dimethacrylate, tetraethylene glycol dimethacrylate and the like: anhydrides of unsaturated acids such as acrylic anhydride, methacrylic anhydride and the like; polyunsaturated acid amides such as N,N-diallyl acrylamide, N,N-diallyl methacrylamide, N,N-methylene bisacrylamide and the like; polyunsaturated ethers such as divinyl ether, diallyl ether, divinyl carbitol, divinyl ether of diethylene glycol and the like; polyunsaturated triazines, the diallyl cyanurate, N,N-diallyl melamine, 2,4-diallyloxy-6-amino-5-triazine, the di- and tri- vinyl cyanurates and derivatives of these and the like; other polyunsaturated nitrogen derivatives such as diallyl amine, diallyl cyanamide and the like; polyunsaturated phosphorus acid esters such as triallylphosphate, diallyl benzenephosphonate, trimethallylphosphate and the like; polyunsaturated organo silicates, such as triallyl silicate, divinyl dichlorosilane and the like; the polyalkene aryl compounds and derivatives including the polyvinyl-, polyvinylidene- and polyallyl aryl compounds, such as divinylbenzenes, trivinylbenzenes, divinyltoluenes, trivinyltoluenes, divinylxylenes, divinyl ethyl benzenes, divinyl biphenyls and divinyl biphenyl oxides, divinylnaphthalenes, divinyl methyl-naphthalenes, and derivates of these including those with alkyl, alkoxy, phenoxy, acetyl, isocyano, amino, nitrile, trifluoro methyl, and halo (F, Cl, Br) groups and the like; unsaturated half esters of unsaturated dicarboxylic acids including the vinyl, vinylidene and allyl half esters of the unsaturated dicarboxylic acids such as maleic, citraconic, itaconic, mesaconic, fumaric, muconic, chloromaleic, aconitic and the like, such as mono-allyl maleic acid, mono-vinyl itaconic acid and the like, and other monomers containing a carboxyl group and plurality of unsaturated double bonds. When the monomer materials are readily oxidized by hydrogen peroxide then such monomers may have to be employed sparingly.

Mutual Solvent-Diluents

The liquid organic mutual solvent-diluent for said hydrogen peroxide, monomer material, drying oil substance and any water present therewith comprises at lease one compound having not more than 6 carbon atoms and containing at least one group selected from the class consisting of hydroxyl, keto and ether groups and combinations thereof. The especially suitable alcohols are methanol, ethanol, n-propanol, isopropanol, tert.-butanol and the less suitable alcohols are n-butanol, isobutanol, sec.-butanol, ethylene glycol, propylene glycol, glycerol, 1-3-butanediol, furfuryl alcohol, tetrahydrofurfuryl alcohol and the like. The ketones which may be used include: acetone, methyl ethyl ketone, diacetone alcohol and the like. For further alcohol-ethers see ethers. The ethers include tetrahydrofuran, tetrahydropyran, 1,4-dioxane, carbitol acetate, methoxy triglycol acetate, 2-methoxyethanol, 2-methoxy-2-propanol, 2-ethoxyethanol, 1-ethoxy-2-propanol, methoxymethoxyethanol, 2-(2-methoxyethoxy)ethanol, 2-(2-ethoxyethoxy)ethanol, and the like. Furthermore the mutual solvents may be used in combinations with each other and with other diluents as set forth heretofore especially in azeotropic mixtures, preferably those in which the mutual solvent-diluent predominates, e.g. methanol/2-butanone 70/30, methanol/1,2-dimethoxyethylene 90/10, methanol/toluene 69/31, ethanol/1,1-dichloropropane 53/47, ethanol/perchloroethylene 61/19, ethanol/toluene 68/32, isopropanol/tetrachloroethylene 81/29, isopropanol/toluene 69/31, n-propanol/toluene 52.5/47.5, and the like. Also there may be employed aqueous azeotropes of the mutual solvent-diluent and such azeotropes may be economically recovered and recycled. Where the mutual solvent-diluent is to be remoed from the polymer product then those solvents with low boiling points are desirable and when such solvent is not to be removed, or only partially removed, then those solvents with high boiling points may be employed.

Conditions

As above indicated the reactions hereof are conducted in liquid phase at sufficiently elevated temperatures above 100°C., preferably above 110°C., to form product with a number average molecular weight in the range of 500 to 10,000, with or without a vapor space depending on whether the reactions are conducted batchwise or continuously. At these temperatures the containing vessel may be subject to considerable pressure, e.g. 300–500 psi. for butadiene-1,3 polymerization, and for other volatile materials employable in accordance with this invention the pressures may range upward to several thousand pounds per square inch, e.g. 5000 to 8000 p.s.i. As all of these polymerization reactions are exothermic, it is important that the reaction systems chosen have adequate heat transfer in order to avoid run-away reactions. The time of polymerization may vary with the materials and temperatures employed, and may range from about one-half hour to five hours or more, a time of from 1 to 3 hours usually being sufficient to obtain an adequate conversion of monomers at selected temperatures, as illustrated in the adjoined examples. Control of the aging of the unsaturated polymer product in the presence of the residual or added hydrogen peroxide and/or mutual solvent before or after stripping of the monomers and/or solvents, which may be expedited by heating, effects control of the oxygen content, more particularly the hydroxyl content, of the polymer product. Thus a significant part, e.g. 2% or preferably 10% or more of the groups of the polymer other than the interpolymerized monomer and any drying oil material therein may be groups other than the two terminal groups of the polymer.

As typical of stripping procedures for separating the volatiles from the interpolymer products, vacuum and heat were employed, with or without steam, in the examples, and such typical procedures are exemplary of any suitable way of recovering the polymerization products.

EXAMPLES 1 THROUGH 37

Tables I through X set forth examples of the formation of polymer products from a combination of two intraphase polymerization systems each containing monomer with or without drying oil substance, hydrogen peroxide, water and mutual solvent-diluent, and lying in the region typified for example by the limited area 2--5-3-2 in FIG. 2. As will be evidenced to one skilled in the art from these illustrative examples, all of the examples containing ethylenically unsaturated monomer material without drying oil substance may be modified by including drying oil substance therein as typified by the examples containing drying oil substance, and conversely all of the examples containing drying oil substance may be practiced without inclusion thereof.

TABLE I

Polymerization from Combinations of Two Single Intraphase Polymerization Systems (parts by wt.)

| Example No. | 1 | 2 | 3 | 4 |
|---|---|---|---|---|
| Drying Oil Substance | | | | |
| Isano Oil | | 2 | | |
| Bodied Linseed Oil[1] | | | 3 | |
| Raw Linseed Oil | | | | 2 |
| Ethylenically Unsaturated Monomer | | | | |
| Butadiene-1,3 | 77 | | | |
| Styrene | | 25 | 30 | |
| Methyl methacrylate | | | | 35 |
| Mutual Solvent-Diluent | | | | |
| Isopropanol | 20.7 | | | |
| Furfuryl alcohol | | | 12 | |
| n-propanol | | 9 | | 7 |
| Hydrogen Peroxide | | | | |
| 50% Aqueous | | 2 | 2 | 3 |
| 47% Aqueous | 4.9* | | | |
| Phases at Ambient Temperatures (75°F.) | | | | |
| Number | 2 | 2 | 2 | 2 |
| Polymerization | | | | |
| Temp., °C. | 120 | 135 | 135 | 135 |
| Time, hrs. | 3 | 3 | 3 | 3 |
| Interpolymer | | | | |
| Yield, wt. | 39 | 25 | 29.8 | 32.5 |
| Yield, % | 51 | 92.6 | 90.3 | 87.8 |
| Viscosity, Gardner | Z-5 | >Z-10 | >Z-10 | >Z-10 |
| Color, Gardner | 1 | 12 | 18 | 10 |

[1]Viscosity, Gardner Z-3
*2.3 parts by weight 100% H$_2$O$_2$ plus 2.6 parts by weight water.

TABLE II

Polymerization from Combinations of Two Single Intraphase Polymerization Systems (Parts by wt.)

| Example No. | 5 | 6 | 7 | 8 |
|---|---|---|---|---|
| Drying Oil Substance | | | | |
| Dehydrated Castor Oil[1] | | 4 | 4 | |
| Tung oil FA | | | | 2 |
| Ethylenically Unsaturated Monomer | | | | |
| Isoprene | 50 | 40 | 56 | |
| Styrene | | | 3 | |
| Cyclohexyl methacrylate | | | | 30 |
| Mutual Solvent-Diluent | | | | |
| Isopropanol | 10 | | | |
| t.-butanol | | 12 | | |
| Ethanol | | | 20 | |
| Methanol | | | | 16 |
| Hydrogen Peroxide | | | | |
| 50% Aqueous | 2 | 2 | 2 | 2 |
| Phases at Ambient Temperature (75°F.) | | | | |
| Number | 2 | 2 | 2 | 2 |
| Polymerization | | | | |
| Temp., °C. | 135 | 135 | 135 | 135 |
| Time, hrs. | 2 | 2 | 2 | 2.5 |
| Interpolymer | | | | |
| Yield, wt. | 39.3 | 26 | 16.5 | 32 |
| Yield, % | 78.6 | 59.1 | 27.5 | 100 |
| Viscosity, Gardner | Z-5 | Z-6 | Z-6 | >Z-10 |
| Color | WW* | WW* | WW* | 13** |

[1]Trademark product Castung 103GH
*WW = water white
**Gardner color number

TABLE III

Polymerization From Combinations of Two Single Intraphase Polymerization Systems (Parts by wt.)

| Example No. | 9 | 10 | 11 | 12 |
|---|---|---|---|---|
| Drying Oil Substance | | | | |
| Tung Oil, blown | 2 | | | |
| Tung Oil | | 1 | | |
| Ethylenically Unsaturated Monomer | | | | |
| Cyclohexyl methacrylate | 35 | | | |
| Methacrylic acid | 2 | | | |
| Butadiene-1,3 | | 51.5 | 28 | 25 |
| Acrylonitrile | | | 4 | |
| Mutual Solvent-Diluent | | | | |
| Methanol | 12 | | | |
| Isopropanol-water Azeotrope | 30 | | | |
| Isopropanol | | | 8 | 8 |
| Hydrogen Peroxide | | | | |
| 50% Aqueous | 2.5 | | | |
| 35% Aqueous | | 4 | 1.5 | 1.5 |
| Phases at Ambient Temperature (75°F.) | | | | |
| Number | 2 | 2 | 2 | 2 |
| Polymerization | | | | |
| Temp., °C. | 133 | 126 | 126 | 126 |
| Time, hrs. | 3 | 5 | 4 | 4 |
| Interpolymer | | | | |
| Yield, wt. | 39 | 39.5 | 18.5 | 19.5 |
| Yield, % | 100 | 76.7 | 57.8 | 78.0 |
| Color | WW* | WW* | WW* | WW* |

*WW = water white

TABLE IV

Polymerization from Combinations of Two Single Intraphase Polymerization Systems (Pts. by wt.)

| Example No. | 13 | 14 | 15 | 16 |
|---|---|---|---|---|
| Drying Oil Substance | | | | |
| Oiticica F.A. | 1 | | | |

TABLE IV-continued

Polymerization from Combinations of Two Single Intraphase Polymerization Systems (Pts. by wt.)

| Example No. | 13 | 14 | 15 | 16 |
|---|---|---|---|---|
| Tung Oil | | 0.8 | | |
| Blown Tung Oil | | | | 5 |
| Ethylenically Unsaturated Monomer | | | | |
| Butadiene-1,3 | 46.5 | 54.7 | 20.5 | |
| Styrene | | 4 | | |
| Methyl methacrylate | | | | 95 |
| Mutual Solvent-Diluent | | | | |
| Methanol | 20 | | | |
| Ethanol | | 16 | | |
| Isopropanol-water Azeotrope[1] | | | 16.7 | |
| Methyl ethyl ketone | | | | 72 |
| Hydrogen Peroxide | | | | |
| 35% Aqueous | 2 | 2 | 1.3 | 15 |
| Phases at Ambient Temperature (75°F.) | | | | |
| Number Polymerization | 2 | 2 | 2 | 2 |
| Temp., °C. | 126 | 126 | 126 | 133 |
| Time, hrs. | 3 | 3 | 4 | 3 |
| Interpolymer | | | | |
| Yield, wt. | 29.5 | 36.0 | 12 | 92 |
| Yield, % | 62.5 | 60.5 | 58.5 | 92 |
| Color | Amber | WW* | WW* | WW* |

*WW = water white
[1]Azeotrope composition 87.8% isopropanol and 12.2% water.

TABLE V

Polymerization from Combinations of Two Single Intraphase Polymerization Systems (Parts by wt.)

| Example No. | 17 | 18 | 19 | 20 |
|---|---|---|---|---|
| Drying Oil Substance | | | | |
| Oiticica Oil | 6 | | 3 | |
| Blown Tung Oil | | 3 | | |
| Solvent-benzene | 30 | | 50 | |
| Ethylenically Unsaturated Monomer | | | | |
| Styrene | 24 | | 50 | |
| Methyl methacrylate | | 50 | | 50 |
| Mutual Solvent-Diluent | | | | |
| t.-butanol | 15 | | | |
| Tetrahydrofuran | | 29 | | |
| Isopropanol | | | 29.5 | |
| Methanol | | | | 4.7 |
| Dioxane | | | | 6.3 |
| Hydrogen Peroxide | | | | |
| 35% Aqueous | 3 | 7 | 6 | 5 |
| Phases at Ambient Temperature (75°F.) | | | | |
| Number Polymerization | 2 | 2 | 2 | 2 |
| Temp., °C. | 130 | 130 | 135 | 135 |
| Time, hrs. | 6 | 6 | 3 | 3 |
| Interpolymer | | | | |
| Yield, wt. | 15.4 | 53 | 46.5 | 50 |
| Yield, % | 51 | 100 | 93 | 100 |
| Color | WW* | WW* | WW* | WW* |

*WW = water white

TABLE VI

Polymerization from Combinations of Two Single Intraphase Polymerization Systems (Parts by wt.)

| Example No. | 21 | 22 | 23 | 24 |
|---|---|---|---|---|
| Drying Oil Substance | | | | |
| Raw Tung Oil | | 4 | | |
| Ethylenically Unsaturated Monomer | | | | |
| Cyclohexyl methacrylate | 30 | | | |
| Methacrylic acid | 5 | | | |
| Styrene | | | 40 | 30 | 30 |
| Acrylonitrile | | 10 | | 12 |
| Solvent-benzene | | | 30 | 24 |
| Mutual Solvent-Diluent | | | | |
| Sec.butanol | 14 | | | |
| t.-butanol | | 19.8 | | |
| Methyl ethyl ketone | | 19.2 | | 6 |
| Isopropanol | | | 15 | |
| Tetrahydrofuran | | | | 58 |
| Hydrogen Peroxide | | | | |
| 50% Aqueous | 2 | | | |
| 35% Aqueous | | 8 | 3 | 4 |
| Phases at Ambient Temperatures (75°F.) | | | | |
| Number Polymerization | 2 | 2 | 2 | 2 |
| Temp., °C. | 138 | 135 | 135 | 135 |
| Time, hrs. | 2 | 3 | 3 | 3 |
| Interpolymer | | | | |
| Yield, wt. | 35 | 54 | 27.8 | 42 |
| Yield, % | 100 | 100 | 92.7 | 100 |
| Color | Amber | Amber | WW* | WW* |

*WW = water white

TABLE VII

Polymerization from Combinations of Two Single Intraphase Polymerization Systems (Parts by Wt.)

| Example No. | 25 | 26 | 27 | 28 | 29 |
|---|---|---|---|---|---|
| Drying Oil Substance | | | | | |
| Blown tung oil | | 3 | | 2 | |
| Ethylenically Unsaturated Monomer | | | | | |
| Isoprene | 4 | 54.3 | | | |
| Styrene | 10 | 10 | | | 23 |
| Methyl methacrylate | | | 40 | 40 | |
| Mutual Solvent-Diluent | | | | | |
| 2-ethoxy ethanol[1] | 17 | | | | 20 |
| Methyl isobutyl ketone | | 5 | | | |
| Isopropyl ether | | | 10 | 10 | |
| Isopropanol | | 15 | 15 | 15 | |
| Hydrogen Peroxide | | | | | |
| 50% Aqueous | 3 | 4 | 4 | 2 | 2 |
| Phases at Ambient Temperature (75°F.) | | | | | |
| Number Polymerization | 2 | 2 | 2 | 2 | 2 |
| Temp., °C. | 130 | 130 | 130 | 130 | 130 |
| Time, hrs. | 4 | 4 | 4 | 4 | 4 |
| Interpolymer | | | | | |
| Yield, wt. | 11.3 | 47.8 | 40.3 | 31.5 | 35[2] |
| Yield, % | 81 | 71 | 100 | 75 | 93 |
| Viscosity, Gardner | solid | Z-6 | solid | solid | Z-6 |
| Color | WW* | WW* | WW* | WW* | WW* |

*WW = water white
[1]Trademark, Cellosolve
[2]Clear liquid having composition of 21.3 solid polymer and 13% Cellosolve.

TABLE VIII

Polymerization from Combinations of Two Single Intraphase Polymerization Systems (Parts by wt.)

| Example No. | 30 | 31 |
|---|---|---|
| Drying Oil Substance | | |
| Tung oil, blown | | 4 |
| Ethylenically Unsaturated Monomer | | |
| Butadiene-1, 3 | 100 | 100 |
| Mutual Solvent-Diluent | | |
| Isopropanol | 35* | 35* |
| Water | 4.9* | 4.9* |
| Hydrogen Peroxide | | |
| 50% aqueous | 6 | 6 |
| Phases at Ambient | | |

TABLE VIII-continued

Polymerization from Combinations of Two Single Intraphase Polymerization Systems (Parts by wt.)

| Example No. | 30 | 31 |
|---|---|---|
| Temperature (75°F.) | | |
| Number | 2 | 2 |
| Polymerization | | |
| Temp., °C. | 125 | 125 |
| Time, hrs. | 4 | 4 |
| Interpolymer | | |
| Yield, wt. | 67.6 | 69.6 |
| Yield, % | 67.6 | 66.9 |
| Viscosity, Gardner | Z-7 | Z-10 |
| Color, Gardner | 1 | 2 |

*Isopropanol/water azeotrope 87.8/12.2 parts by weight.

TABLE IX

Polymerization from Combinations of Two Single Intraphase Polymerization Systems (Parts by wt.)

| Example No. | 32 | 33 | 34 |
|---|---|---|---|
| Ethylenically Unsaturated Monomer | | | |
| Isoprene | 100 | 100 | |
| Styrene | | | 100 |
| Mutual Solvent-Diluent | | | |
| Isopropanol | 5 | 5 | 5 |
| Hydrogen Peroxide | | | |
| 35% aqueous | 1.43 | 1.43 | 1.43 |
| 100% basis | 0.50 | 0.50 | 0.50 |
| Water | 0.93 | 0.93 | 0.93 |
| Diluent | | | |
| Water | 4.0 | 3.5 | 4.0 |
| Charge | | | |
| Total wt. | 110.43 | 109.93 | 110.43 |
| Phases at Ambient Temperature (75°F.) | | | |
| Number | 2 | 2 | 2 |
| Primary Phase (75°F.) | | | |
| Wt. | 104.1 | 104.5 | 104.4 |
| Secondary Phase (75°F.) | | | |
| Wt. | 6.327 | 5.436 | 6.01 |
| Polymerization | | | |
| Temp., °C. | 121 | 121 | 121 |
| Time, hrs. | 5 | 5 | 5 |
| Polymer | | | |
| Form | liquid | liquid | solid |
| Yield, wt. | 12.4 | 12.6 | 99.0 |
| Yield, % | 12.4 | 12.6 | 99.0 |
| Viscosity, Gardner | Z-6 | Z-6 | — |
| Color | WW* | WW | WW |

*WW = water white

TABLE X

Polymerization from Combinations of Two Single Intraphase Polymerization Systems (Parts by wt.)

| Example No. | 35 | 36 | 37 |
|---|---|---|---|
| Ethylenically Unsaturated Monomer | | | |
| Isoprene | — | — | 20 |
| Styrene | 100 | 100 | 80 |
| Mutual Solvent-Diluent | | | |
| Isopropanol | 5 | 5 | 5 |
| Hydrogen Peroxide | | | |
| 35% aqueous | 1.43 | 1.43 | 1.43 |
| 100% basis | 0.50 | 0.50 | 0.50 |
| Water | 0.93 | 0.93 | 0.93 |
| Diluent | | | |
| Water | 3.5 | 8.5 | 8.5 |
| Charge | | | |
| Total Wt. | 109.93 | 114.93 | 114.93 |
| Phases at Ambient Temperature (75°F.) | | | |
| Number | 2 | 2 | 2 |
| Primary Phase (75°F.) | | | |
| Wt. | 104.1 | 103.29 | 103.44 |
| Secondary Phase (75°F.) | | | |
| Wt. | 5.50 | 11.62 | 11.09 |
| Polymerization | | | |
| Temp., °C. | 121 | 115 | 115 |
| Time, hrs. | 5 | 4 | 4 |
| Polymer | | | |
| Form | Solid | Solid | Solid |
| Yield, wt. | 99.5 | 94.9 | 52.2 |
| Yield, % | 99.5 | 94.9 | 52.2 |
| Viscosity, Gardner | — | — | — |
| Color | WW* | WW | WW |

*WW = water white

While there have been described herein what are at present considered preferred embodiments of the invention, it will be obvious to those skilled in the art that modifications and changes may be made without departing from the essence of the invention. It is therefore to be understood that the exemplary embodiments are illustrative and not retrictive to the invention, the scope of which is defined in the appended claims, and that all modifications that come within the meaning and range of equivalency of the claims are intended to be included therein.

I claim:

1. A method for forming a polymer material solid at ambient temperatures and having a number average molecular weight in the range of 500 to 10,000, which method comprises:

a. forming a combination of two intraphase polymerization systems, each of said intraphase polymerization systems containing a combination of polymerizable unsaturated material, aqueous hydrogen perioxide as polymerization catalyst, and a mutual solvent therefor in proportions for effecting intraphase polymerization in said system and one of said systems being a major phase and the other a minor phase, by combining the following ingredients:

1. from 0–95 parts by weight of drying oil substance selected from the class consisting of the drying oils, the air-blown or bodied drying oils, and the fatty acids derived from the foregoing, and dimers, trimers, and tetramers thereof, 2. from 5–100 parts by weight of polymerizable monomer material which forms polymeric material which, at said molecular weight range and at ambient temperature, is a solid, and which is selected to consist essentially of from 2 to 100 percent by weight of material having a water solubility at 20°C. of no more than 3.5 weight percent and from 0 to 98 percent by weight of material having water solubility at 20°C. greater than 3.5 weight percent, and selected from the ethylenically unsaturated monomers that have and are polymerizable with the aid of hydrogen perioxide through at least one $>C=C>$ group and contain not more than 14 carbon atoms, 3. an amount in the range of from 0.5 to 10 parts by weight of hydrogen peroxide (100% basis) per 100 parts by weight of said ingredients (1) and (2), 4. an amount in the range of from 0.4 to 50 parts by weight of water per 100 parts by weight of ingredients (1), (2) and (5), and 5. an amount in the range of from 5 to 100 parts by weight, per 100 parts by weight of ingredients (1) and (2), of liquid organic mutual solvent-diluent for said hydrogen peroxide, monomer material, water and any drying oil substance present therewith, which amount lies at a point in said range sufficiently high to enable step (b) to produce polymers in said average molecular weight range but not so high as to completely convert the two phases into a single phase, and is at least half as great by weight as the weight of ingredient (4), and which liquid organic mutual solvent-diluent comprises at least one compound which contains at least one group selected from the class consisting of hydroxyl, keto and ether groups and combinations thereof, and b. heating said combination, essentially in the absence of material which appreciably decomposes hydrogen peroxide to form oxygen, at sufficient temperatures in the range of above 100°C. to about 200°C. for sufficient time to form polymer material having a number average molecular weight in the range of 500 to 10,000 and containing groups derived from the solution of hydrogen peroxide in said liquid organic mutual solvent-diluent.

2. A method for forming a polymer material having a number average molecular weight in the range of 500 to 10,000 which method comprises:

a. forming a combination of two intraphase polymerization systems, each of said intraphase polymerization systems containing a combination of polymerizable material, aqueous hydrogen peroxide as polymerization catalyst, and a mutual solvent therefor in proportions for effecting intraphase polymerization in the said system, and one of said systems being a major phase and the other a minor phase, by combining the following ingredients:

1. from 0–95 parts by weight of drying oil substance selected from the class consisting of the drying oils, the air-blown or bodied drying oils, and the fatty acids derived from the foregoing, and dimers, trimers, and tetramers thereof, 2. from 5–100 parts by weight of polymerizable monomer material selected to consist essentially of from 2 to 100 percent by weight of material having a water solubility at 20°C. of no more than 3.5 weight percent and from 0 to 98 percent by weight of material having water solubility at 20°C. greater than 3.5 weight percent, and selected from the ethylenically unsaturated monomers that have and are polymerizable with the aid of hydrogen peroxide through at least one > C = C > group and contain not more than 14 carbon atoms, 3. an amount in the range of from 0.5 to 10 parts by weight of hydrogen peroxide (100% basis) per 100 parts by weight of said ingredients (1) and (2), 4. an amount in the range of from 0.4 to 50 parts by weight of water per 100 parts by weight of ingredients (1), (2) and (5), and 5. an amount in the range of at least 5 parts by weight, per 100 parts by weight of ingredients (1) and (2), of liquid organic mutual solvent-diluent for said hydrogen peroxide, monomer material, water and any drying oil substance present therewith, which amount lies at a point in said range sufficiently high to enable step (b) to produce polymer in said average molecular weight range but not so high as to completely convert the two phases into a single phase and is at least half as great by weight as the weight of ingredient (4), and which liquid organic mutual solvent-diluent comprises at least one compound which contains at least one group selected from the class consisting of hydroxyl, keto and ether groups and combinations thereof, and b. heating said combination, essentially in the absence of material which appreciably decomposes hydrogen peroxide to form oxygen, at sufficient temperatures in the range of above 100°C. to about 200°C. for sufficient time to form polymer material having a number average molecular weight in the range of 500 to 10,000 and containing groups derived from the solution of hydrogen peroxide in said liquid organic mutual solvent-diluent.

3. A method according to claim 2, wherein at least the major proportion of the liquid organic mutual solvent with which the combination of phases is formed is selected from the $C_1$ to $C_4$ alcohols.

4. A method according to claim 2, wherein at least the major proportion of the liquid organic mutual solvent with which the combination of phases is formed is isopropanol.

5. A method according to claim 2, wherein the ethylenically unsaturated monomer material with which the combination of phases if formed consists essentially of monomer selected from the class consisting of the vinylidene monomers and conjugated diene monomers.

6. A method according to claim 5, wherein the ethylenically unsaturated monomer material with which the combination of phases is formed consists at least 2 percent of conjugated diene monomer.

7. A method according to claim 6, wherein the ethylenically unsaturated monomer material with which the combination of phases is formed consists at least 98 percent of conjugated diene monomer.

8. A method according to claim 6, wherein the ethylenically unsaturated monomer material with which the combination of phases is formed consist essentially of butadiene-1,3.

9. A method according to claim 6, wherein the ethylenically unsaturated monomer material with which the combination of phases is formed consist essentially of isoprene.

10. A method as claimed in claim 5, wherein said ethylenically unsaturated monomer material with which the combination of phases is formed consists essentially of butadiene-1,3 and acrylonitrile, and the polymer material formed is an unsaturated butadiene-acrylonitrile interpolymer having said derived groups.

11. A method as claimed in claim 5, wherein said ethylenically unsaturated monomer material with which the combination of phases is formed consists essentially of butadiene-1,3 and styrene, and the polymer material formed is an unsaturated butadiene-styrene interpolymer having said derived groups.

12. A method according to claim 5, wherein the ethylenically unsaturated monomer material with which the combination of phases is formed consists at least 2 percent of vinylidene monomer.

13. A method according to claim 5, wherein the ethylenically unsaturated monomer materials with which the combination of phases is formed consists at least 98 percent of vinylidene monomer.

14. A method according to claim 5, wherein the ethylenically unsaturated monomer material with which the combination of phases is formed consists essentially of styrene.

15. Each and every feature and combination of novelty herein disclosed substantially as described.

* * * * *